United States Patent
Lahr

(10) Patent No.: US 7,082,393 B2
(45) Date of Patent: Jul. 25, 2006

(54) HEAD-WORN, TRIMODAL DEVICE TO INCREASE TRANSCRIPTION ACCURACY IN A VOICE RECOGNITION SYSTEM AND TO PROCESS UNVOCALIZED SPEECH

(75) Inventor: Roy J. Lahr, Los Angeles, CA (US)

(73) Assignee: RAST Associates, LLC, Long Beach, CA (US)

( * ) Notice: Subject to any disclaimer, the term of this patent is extended or adjusted under 35 U.S.C. 154(b) by 618 days.

(21) Appl. No.: 10/109,236

(22) Filed: Mar. 27, 2002

(65) Prior Publication Data

US 2002/0194005 A1    Dec. 19, 2002

Related U.S. Application Data

(60) Provisional application No. 60/279,116, filed on Mar. 27, 2001.

(51) Int. Cl.
 *G10L 15/20* (2006.01)
(52) U.S. Cl. .................. 704/233; 381/375; 381/376
(58) Field of Classification Search ................ 704/233; 381/375, 376
See application file for complete search history.

(56) References Cited

U.S. PATENT DOCUMENTS

| | | | | |
|---|---|---|---|---|
| 1,235,851 A | * | 8/1917 | Spence | 379/430 |
| 4,783,822 A | * | 11/1988 | Toole et al. | 381/379 |
| 5,381,486 A | * | 1/1995 | Ludeke et al. | 381/375 |
| 5,473,726 A | * | 12/1995 | Marshall | 704/231 |
| 5,621,858 A | | 4/1997 | Stork et al. | |
| 5,715,321 A | * | 2/1998 | Andrea et al. | 381/92 |
| 6,041,130 A | * | 3/2000 | Goss | 381/374 |
| 6,163,765 A | | 12/2000 | Andric et al. | |
| 6,185,529 B1 | * | 2/2001 | Chen et al. | 704/251 |
| 6,236,969 B1 | * | 5/2001 | Ruppert et al. | 704/275 |
| 6,282,154 B1 | * | 8/2001 | Webb | 704/275 |
| 6,343,269 B1 | * | 1/2002 | Harada et al. | 704/243 |
| 6,853,972 B1 | * | 2/2005 | Friedrich et al. | 704/275 |
| 6,856,952 B1 | * | 2/2005 | Clapper | 704/200 |
| 6,889,192 B1 | * | 5/2005 | Friedrich et al. | 704/275 |

FOREIGN PATENT DOCUMENTS

WO    WO 00-07176    2/2000

* cited by examiner

*Primary Examiner*—Martin Lerner
(74) *Attorney, Agent, or Firm*—Kenyon & Kenyon LLp

(57) ABSTRACT

A voice recognition device and method allows position-stabilized capture of spoken sounds with great repeatability and accuracy. The voice recognition device may additionally provide two channels of lip movement information to supplement the usual audible speech component recognition system in selecting the proper pairing of data input to text output. The voice recognition device may provide a further channel of information about the speech generating motions via an ultrasonic injection of sound into the vocal cavity and subsequent decoding of the emitted sound after injection. The ultrasonic injection and decoding may also used to provide audible clues as to the unvoiced sound formed by speaking when the vocal cords are not energized. The ensemble of electronic equipment upon the bail band may be in microcircuit form, including placing the components on a copper layer polyimide flexible strip.

50 Claims, 10 Drawing Sheets

Voice Recognition as a System

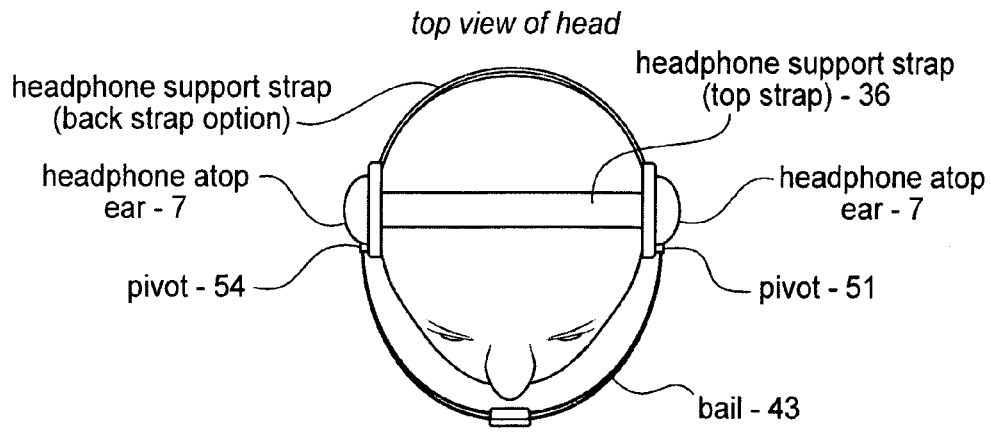
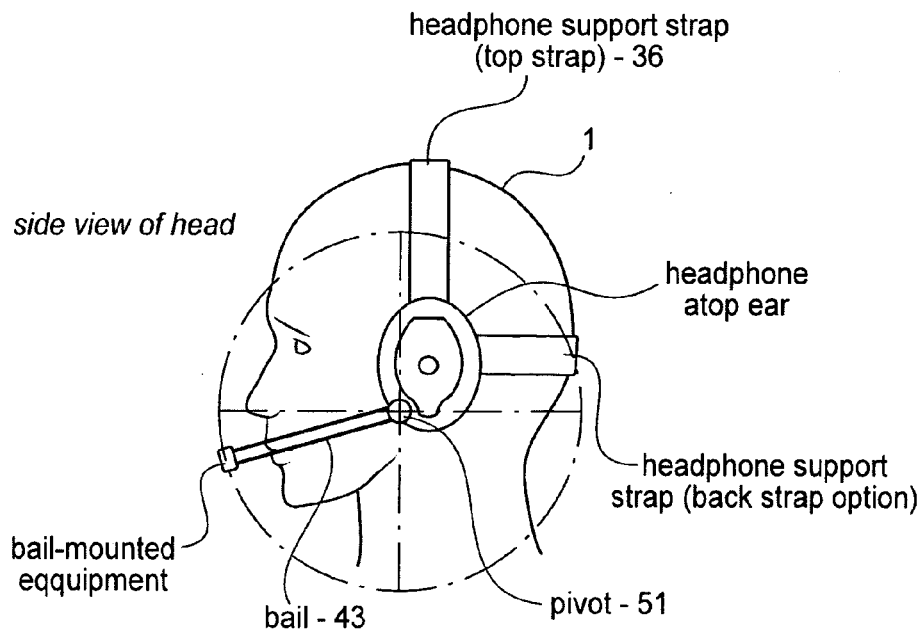
Fig 1 - Bail for providing stable mounting for speech associated equipment Bail arm swung upwards to remove it as an obstruction during eating, drinking, use of telephone handset Bail arm swung downwards to remove it as an obstruction during eating, drinking, use of telephone handset

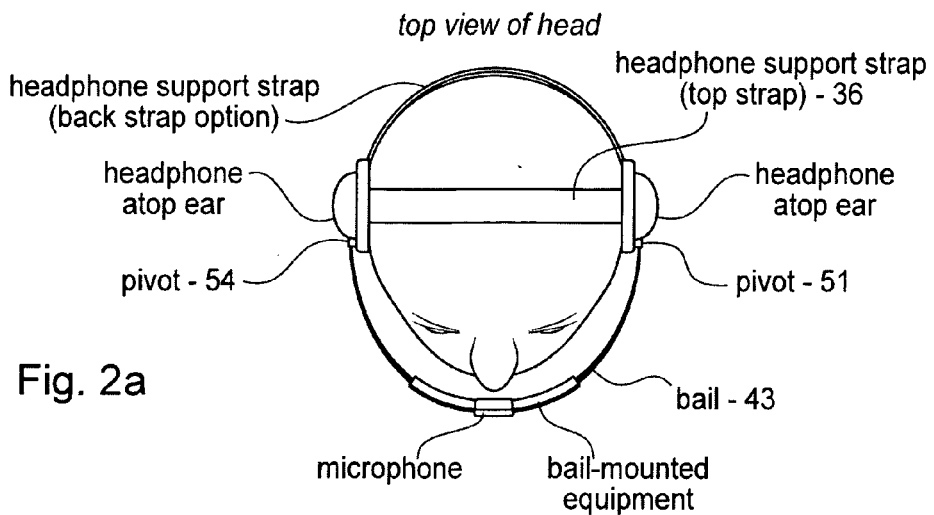
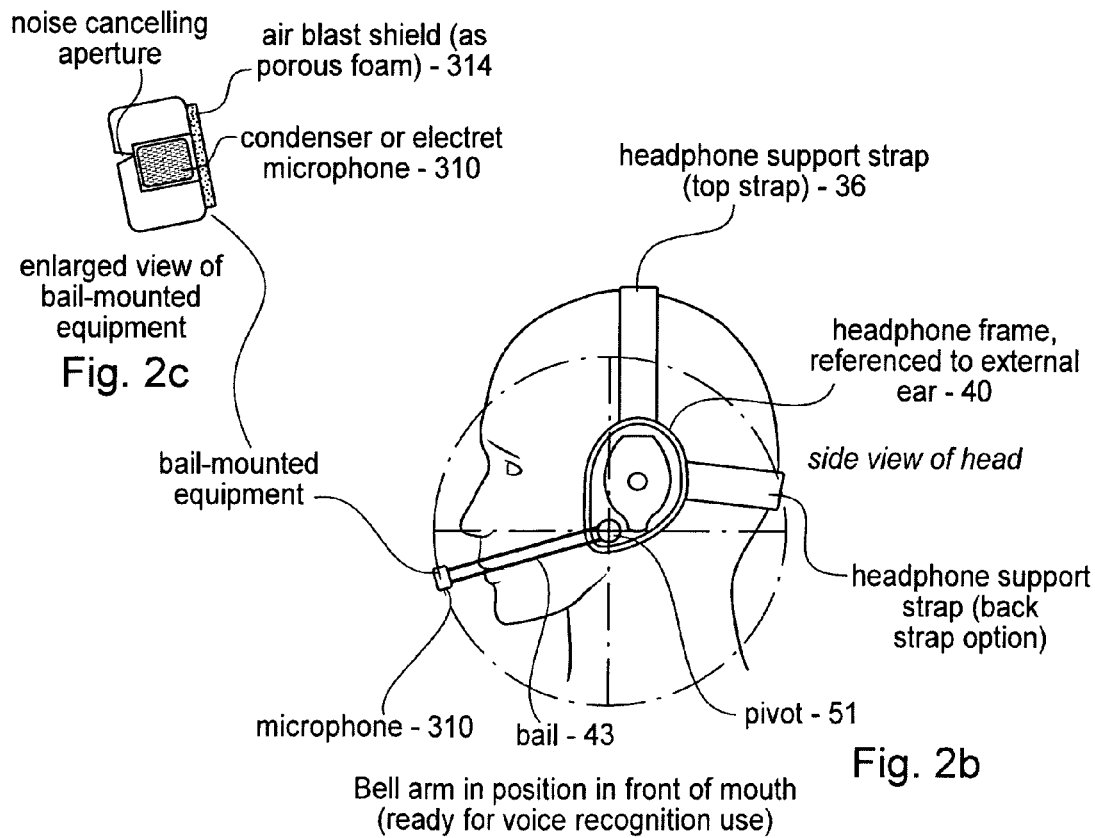
Fig. 2 Details of bail mounted equipment

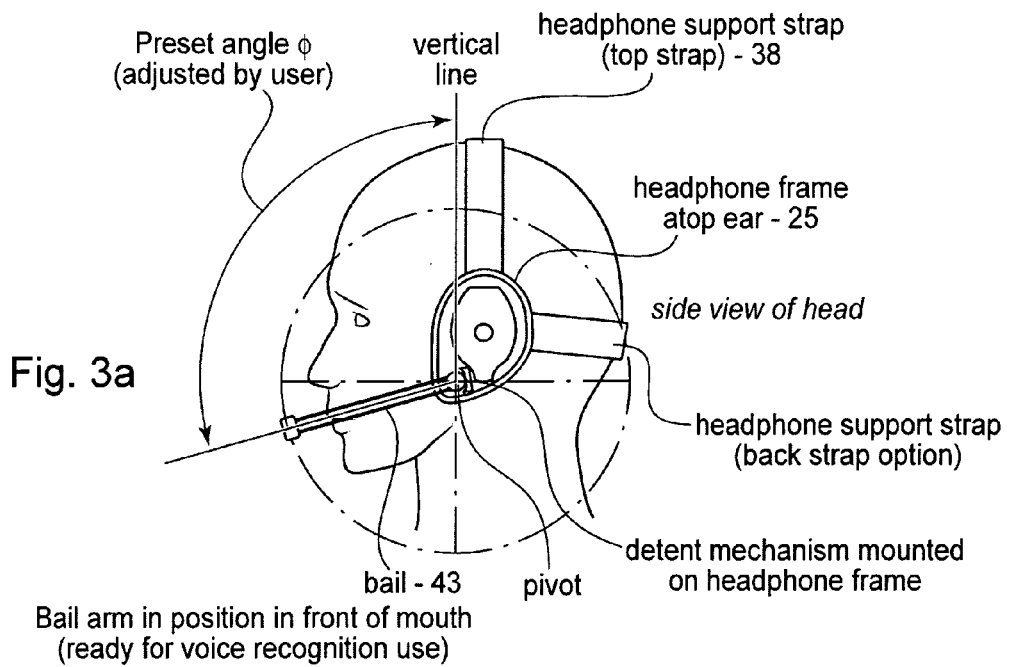
Fig. 3a — Shows location of detent mechanism
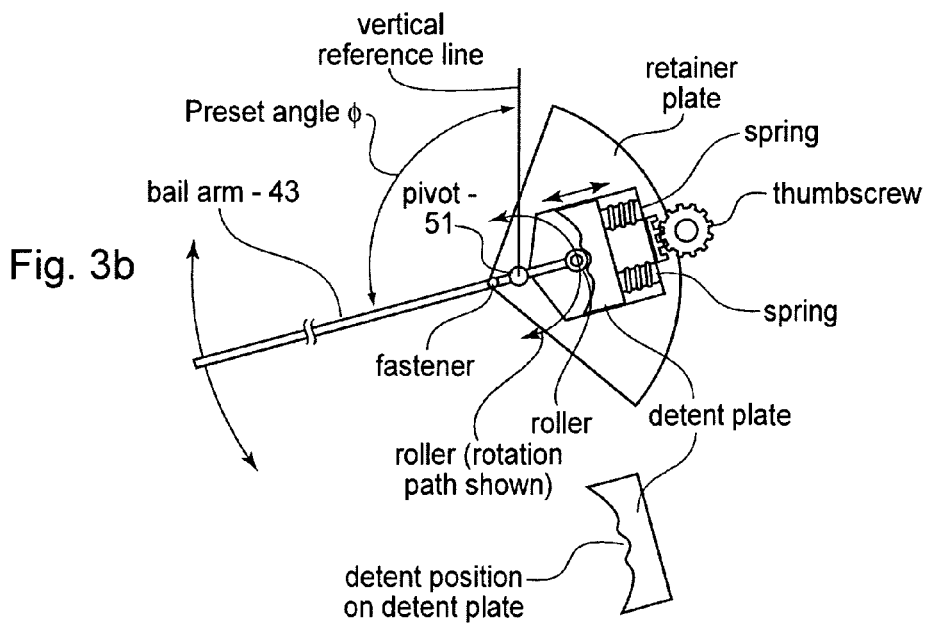
Fig. 3b — Enlarged view of detent mechanism
Fig. 3 Details of bail position detent NOTE:
When ball on end of swing arm just touches face above upper lip, the thumbscrew on the detent mechanism is tightened to set the bail mechanism detent location (ie, the preset location for the bail arm so that the microphone is in an ideal position for voice recording).

Fig. 4 Bail position swing arm

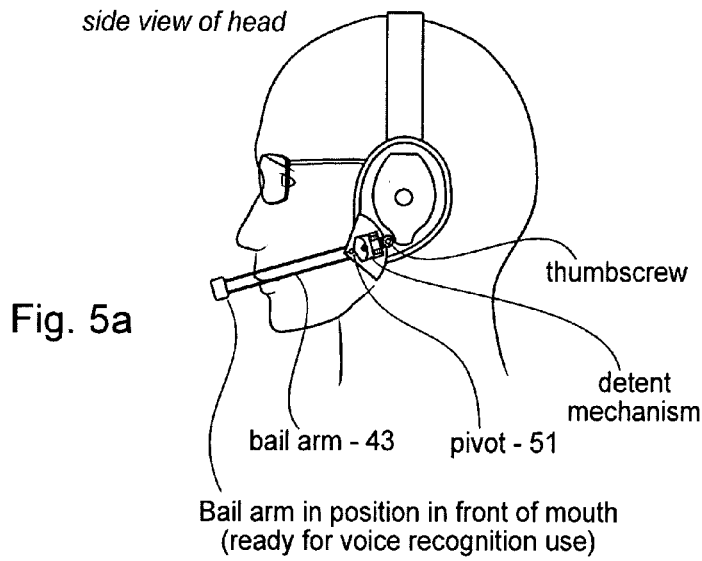

Fig. 5a

Bail arm in position in front of mouth
(ready for voice recognition use)

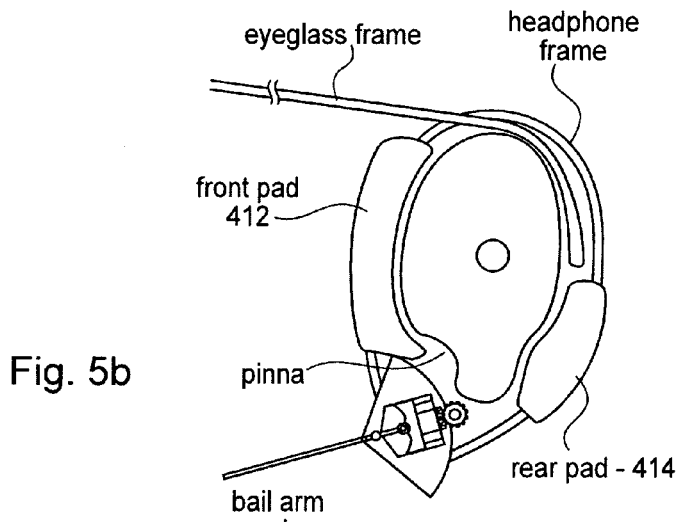

Fig. 5b

Enlarged view of headphone frame pads

NOTE:
The two pads "surround" the ear's pinna so as to provide a repeatable positioning for the headphone frame after repeated removal and replacement of the headphones. Note that room is left for eyeglass frames to pass around the top of the pinna.
If the headphone frame is worn against the head ("closed" operation), the eyeglass frames go atop the headphone frame.
If the headphone frame is worn outboard of the head ("open" operation), the eyeglass frames go under the headphone frame.

Fig. 5 Ball position swing arm

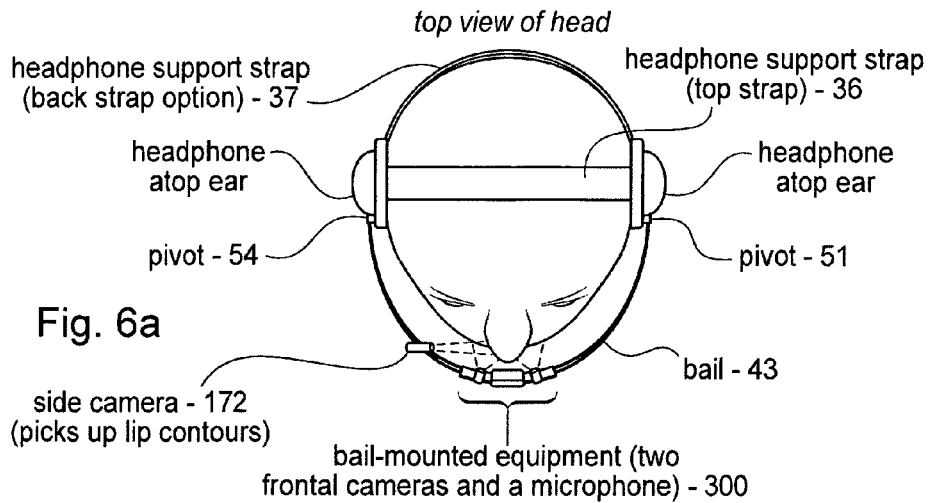

Fig. 6a

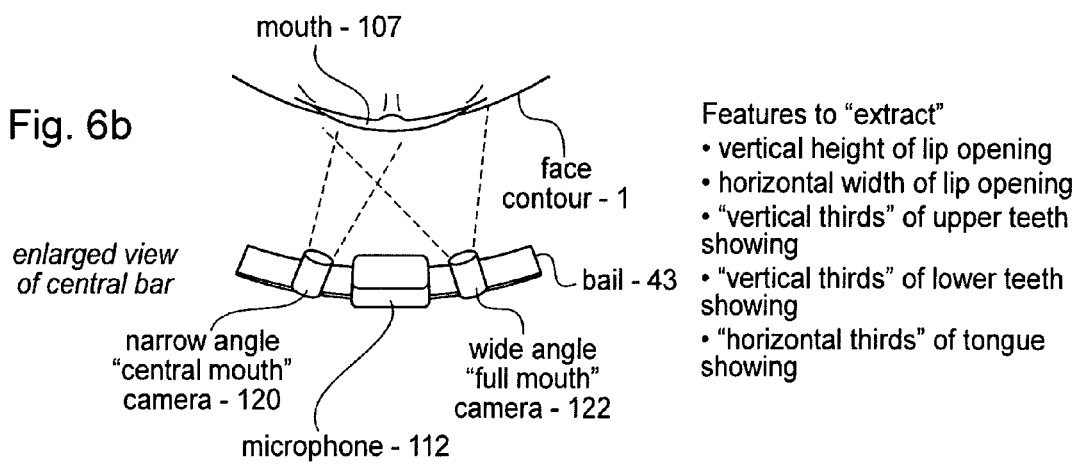

Fig. 6b

Features to "extract"
• vertical height of lip opening
• horizontal width of lip opening
• "vertical thirds" of upper teeth showing
• "vertical thirds" of lower teeth showing
• "horizontal thirds" of tongue showing

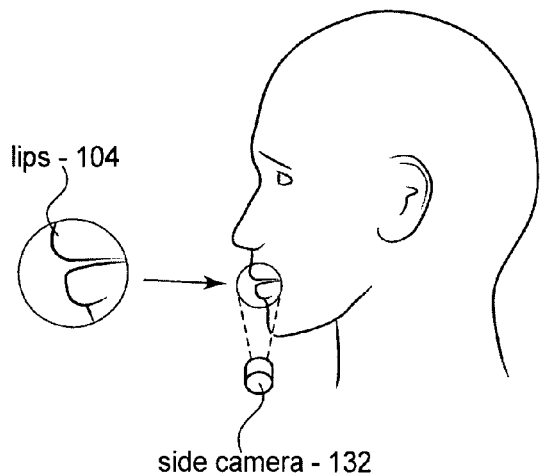

Fig. 6c

Features to "extract"
(1) lips open?
(2) and how much (1/3, 2/3, or 3/3?)
(3) lips protrude?
(4) and how much (1/3, 2/3, or 3/3?)

third camera for side view of lips ("lips open and how much") view

Typical features to "extract"
• vertical height of lip opening
• horizontal width of lip opening
• "vertical thirds" of upper teeth showing
• "vertical thirds" of lower teeth showing
• "horizontal thirds" of tongue showing Fig. 7 Machine Lip Reading Basics

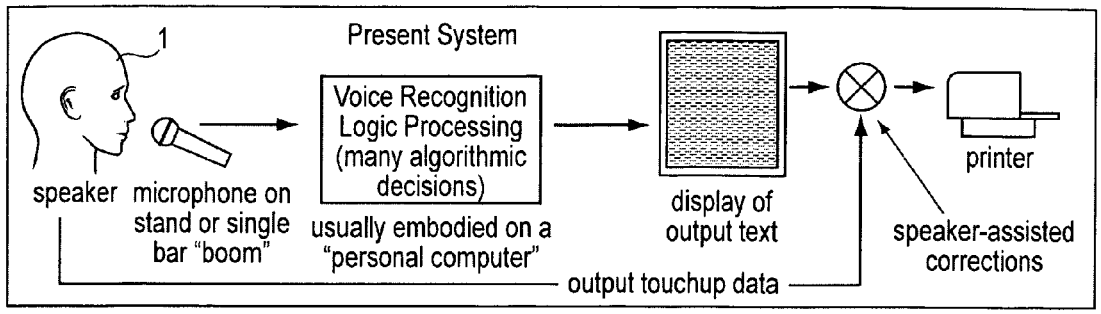
Fig. 8a *Prior Art*
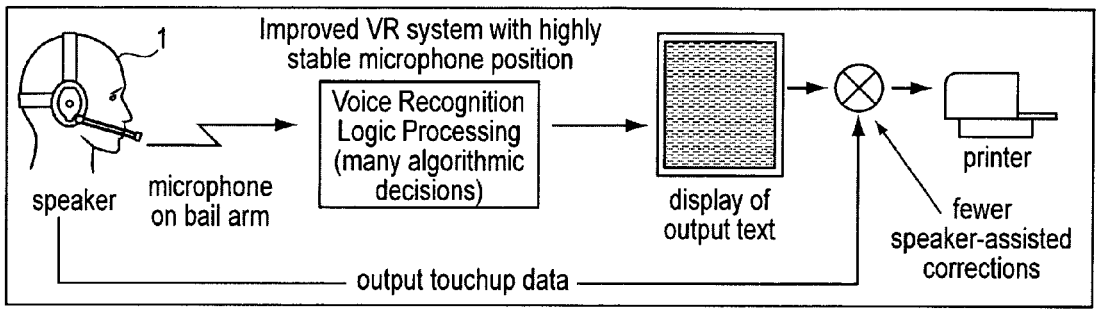
Fig. 8b
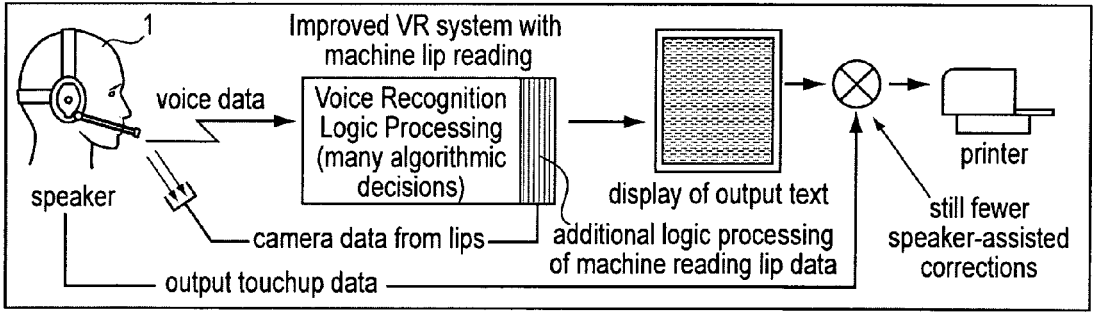
Fig. 8c
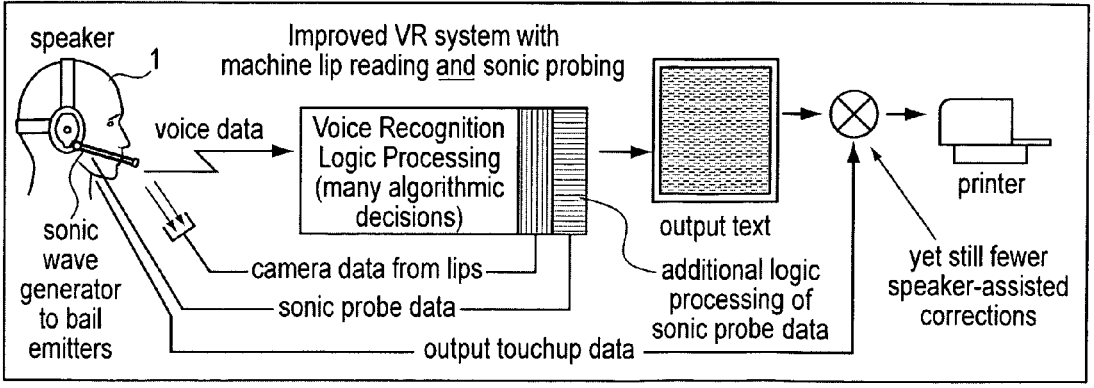
Fig. 8d
Fig. 8 Voice Recognition as a System Fig. 9 System for recognizing non-vocalized speech

HEAD-WORN, TRIMODAL DEVICE TO INCREASE TRANSCRIPTION ACCURACY IN A VOICE RECOGNITION SYSTEM AND TO PROCESS UNVOCALIZED SPEECH

CROSS-REFERENCE TO RELATED APPLICATIONS

This application claims the benefit of U.S. Provisional Patent Application No. 60/279,116, filed on Mar. 27, 2001, and is expressly incorporated herein in its entirety by reference thereto.

FIELD OF INVENTION

The present invention relates to a head-worn, tri-modal device for increasing transcription accuracy in a voice recognition process and/or for processing unvocalized speech.

BACKGROUND INFORMATION

Keyboard activities such as "touch typing" have been available to create a text record of a user's thoughts. That is, a user manually types in the user's thoughts on a keyboard or similar device to memorialize those thoughts in an electronic file or hard paper file or the like. For those who do not type as fast and as accurately as their thoughts, as well as for those users unable to use a keyboard for any such reason, such keyboard-inputting, or "touch typing", may not be desirable.

Devices have been available which purportedly allow users to input thoughts into a electronic file or hard paper file without use of a keyboard or similar physical inputting interface. That is, devices and/or processes have been devised which will convert the spoken word into text without use by the user of a keyboard. Some companies which purportedly offer such devices and/or processes include IBM with "Via Voice," and Lemout and Hauspie with "Dragon Dictate". Such software recognition programs may be installed on a personal computer. In some cases, a remote computer may be used and the input sounds are purportedly coupled to that remote computer by telephone lines and/or radio frequency reception (such as via cellular telephones or other wireless communications devices). To furnish input to the voice recognition programs, an available practice is to use a microphone mounted on one side of the head, usually coupled to an earphone by a "boom" arm. The headphone and frame are positioned upon the head using a headband under tension, either top mount or rear mount. The microphone is to be positioned by adjusting the boom so that the "mike" is close to the user's mouth.

Some software programs provide feedback to the user that the microphone is positioned that "good quality" sound is being picked up by the microphone. Usually, this means that the observed signal level meets or exceeds a manufacturer-chosen threshold level that might provide the voice recognition circuitry enough signal to properly make algorithmic decisions as to what words are being spoken.

Oftentimes, the software manufacture provides a series of written training pages of text which are to be read aloud by the prospective user into the voice recognition system to "train" that system to help to make correct choice pairings of observed sound patterns and the furnished text samples. This training may be successful depending upon user patience during the training process and training adequacy as to how many paragraphs of text should be read into the system.

The microphone position will most often vary somewhat between the initial training session and the actual use sessions, either because the headphone (with the microphone boom attached) has been removed and replaced, as for eating or drinking, or just the microphone boom is pushed out of position in relation to the earphone for these activities. Because of these difficulties, the accuracy of transcription of a voice recognition system seldom exceeds 90%, that is, there are errors in transcription by the voice recognition system during a nominal 10% of the spoken input. This means that the user must correct this nominal 10% of the output text derived from the voice recognition sessions. The correction can purportedly be made by speaking individual letters, defining what would have been the correct text generated, or the correction can be made by typing, if a keyboard is available to the user. If the error fraction exceeds much over 10%, the "after speaking" correction of the voice recognition system output can become time burdensome for the user, and the system may be considered as a nuisance, that is, not useful in a practical sense.

SUMMARY OF THE INVENTION

Exemplary embodiments and/or methods of the present invention may be directed to providing further modes to aid in voice recognition systems that may increase the accuracy of transcription of the spoken word, perhaps by 5% or more.

Exemplary embodiments and/or methods of the present invention may be directed to presenting a methodology for obtaining a written record of the words spoken in a non-voiced manner; that is, with the usual vocal fold modulation omitted, and where possible, speaking naturally, but with a more open lip/teeth/tongue placement to the extent that may be comfortable for a user.

A pivoting bail band worn on the head which uses the location of the ears as reference points for a pivoting, wherein both pivot points are adjacent to said ear locations. The pivoting bail band may be a mechanical platform from which to make very stable measurements of the sound and other data when spoken words are to be recognized by machine. As indicated below, "ear surround" pads may be arranged as location reference points, but still allowing glasses to be worn with the glasses "tail" fitting onto the pinna of the ears.

The bail band pivoting may be adjusted by the wearer so that the bail band is immediately in front of the lips. The platform is adjustable so that it may be placed just in front of the speaker's lips, so as to get "best record" of the spoken word. In a further exemplary embodiment, the pivoting of the bail band can be repeatedly indexed to said lip position after positioning the bail band away from said lip position, as pivoting to the forehead region or below chin position so as to offer no impediment to eating, drinking, telephoning or other chosen activities that involve free access to the mouth region. It may be useful to provide a method for moving the pivoting bail band platform out of the way temporarily when the person is eating, drinking, using the telephone, or other tasks that involve positioning things close to the lips, yet returning to the exact measuring position as before.

In a further exemplary embodiment, the bail band having pivoting to the forehead region may be positioned so that there is clearance between the pivoting bail band and the eye region for pivoting around eyewear, as glasses or a head-worn display device positioned adjacent to the eye(s). The bail band should be adjustable in clearance to the face when moved upward so as to "clear" mechanical obstructions, such as the frame of glasses or a computer vision accessory.

This may be achieved by first adjusting the ends of the pivoting bail band at the ear pivot points.

In a further embodiment of the bail band, the spacing between the lips and the bail band may be adjustable, but then may be fixed by the user to conform to a pre-established bail band to lip distance. The clearance should also provide reasonably close proximity to the lips when in the "measurement position", thus the clearance adjustments should be balanced, that is, just clearing mechanical obstructions near the eye, yet maintaining minimum practical distance from the center of the pivoting bail band to the lips.

In a further embodiment of the bail band, a bar of fixed length can be pivoted from an end fixed on the pivoting bail band providing a reference length for user adjustment of the bail band to lip distance. In order to accurately position the pivoting bar directly in front of the lips, a swinging bar (hinged from the pivoting bail band) can be swung away from the bail band so that the end can touch the crevice between the closed lips).

In a further embodiment of the bail band, the end of the pivoting reference bar may be rounded, as by a sphere on the end of the reference bar so that the user is not concerned that it will cause injury or pain during adjustment of the pivoting bail band. A rounded ball or other smooth surface is provided at the end of the swinging bar that touches the crevice between the closed lips, to assure the user that they will not be "poked" by the bar in such a way as to cause annoyance or pain.

In a further embodiment of the bail band, the pivoting reference bar may be used at an angle other than orthogonal with respect to the frontal region of the pivoting bail band, so that individuals may have some choice as to the distance from lip to bail band, but yet are guided by the maximum distance between bar and lips provided by an orthogonal reference bar placement. Since the swinging bar is pivoted from a region near the center of the bar, it only has to be moved until the rounded end touches the lip crevice, and the swinging bar need not be orthogonal to the pivoting bail band at that point.

In a further embodiment, the pivoting reference bar may be constructed of thin or translucent material so as to present minimum visual apparent size when the reference bar is in use, or if stored so that the reference bar is essentially parallel to the frontal aspect of the bail band. Further embodiments are directed to providing a pivoting bail band that has minimum visual "weight" so that the user will find the use of a pivoting bail band in front of the face "attractive", rather than potentially "ugly". Various semi-transparent materials (as plastic) may be used to reduce the visual "weight" of the bail band. Durable plastics which are translucent are available, for example, acrylic butyl styrene mixes, or glass-reinforced polymers.

In a further embodiment, the pivoting bail band may include a microphone in a central location, pointed toward the lips. The microphone is to pick up the sound of spoken words, and since it has a very stable and repeatable location, the pickup will accurately represent the spoken words emitted from the lips. The microphone may be augmented in which sound pickup from a direction away from the lips is used to provide a cancellation of adjacent noise, by mechanical subtraction or electronic subtraction. The microphone may have a noise cancellation port away from the lip direction so that there is a mixing of ambient noise and the signal picked up from the lip direction (which contains some ambient noise) so as to mechanically subtract the noise from the signal so that the "lip signal" has a markedly reduced noise content. Alternately, a second microphone may be used to pick up the ambient noise from the region and this "ambient noise" signal is electronically subtracted from the "lip signal" so as to similarly provide a clean voice signal record. The microphone may be physically dual ported (first port=sound plus noise and the other port=noise only, but phased to have the two noise signals cancel). Alternately, two separate microphones may be used, one pointed toward the mouth, the other to the front, as through a small aperture in the bail band, and electrically connected so the two signal phases tend to cancel the noise in the spoken word signal. The microphone may include a plurality of individual microphones whose output signals are phase adjusted to provide a very accurate pickup of the spoken word from the lip region. In a further embodiment, an array of microphones are used to achieve a better sound pickup "shape", the array of microphones being, for example, a linear array, in which the separate sound signals are phased to comprise a virtual microphone of a "pickup sensitivity" shape that is superior to that which may be possible to realize in a single microphone. Specifically, a further embodiment may include a "cardioid" pickup shape (vector sensitivity drawing plot) from a single microphone. However, with an array of microphones, one may "tune" the pickup shape to be a sharp "lobe" shape in the desired direction, here, towards the lips. It may include a linear row of several microphone "chips" with interconnecting circuitry which adjusts the phase and amplitude contribution of each microphone chip to the spoken word sound signal. The microphone may have a porous cover of foam or wire over it so that air blasts or other undesirable projections from the lips of the user do not directly impinge on the sensitive area of the microphone.

Because of the close proximity of the lips to the microphone, a "blast shield" may be necessary to prevent undesired projections during speech from causing "spikes" in the sound recording and distorting the record of the spoken word. Note that a porous cover will still allow some "breath sounds", so that plosives or other "breathy" sounds that are a normal part of speech will be satisfactorily recorded by the microphone.

In a further embodiment, the microphone may have a porous cover of foam or wire so that air blasts from the lips do not directly impinge on the sensitive area of the microphone. An array of microphones may also have a such a "blast cover" so that the proximity to the lips does not cause unwanted "breath spikes" in the electronic record of the spoken words. A blast cover for a linear array of microphone chips may be very similar to the single microphone chip.

A further embodiment of the bail bond may use specific regional shapes of the head for reference points from which to mount pivots so that the bail band may be repeatedly placed on the head so as to be precisely located in reference to the lips. Instead of using the ear position as locators, a "sweat band strap" together with an "over the head" strap can be combined to provide accurate reference points from which to pivot the bail band so as to position the pivoting bail band directly in front of the lips, ie, providing a repeatable, "stable base" from which to make sound measurements of the spoken word. Other "phrenological" head shapes may be used to locate the pivoting bail band, such as the curve of the upper neck as it joins the back of the head, together with an "over the head" strap so as to furnish a suitably repeatable pivot location.

A further embodiment of the pivoting bail band may include a first camera pointing toward the lips is placed, mounting the camera at a nearly central location on the side of the pivoting bail band closest to the lips so as to provide a frontal lip camera function.

These days, chip cameras are very small, and, for instance, a ⅐th inch square CMOS camera chip may be placed directly on the pivoting bail band, with a tiny lens so that the central portion of the lips are imaged (for example, a 1-¼" high by 3-½ inch wide *zone*), providing a frontal view of the lips as they move up and down and laterally during *speech*. Either a *"color camera"* can be *used*, or more *probably*, a black and white chip camera that is sensitive in the near IR as well as the visible would be preferable since the *"low light"* response of that type of chip is far superior to a color camera *chip*. A frontal lip camera may provide an additional *"lip reading"* channel of information to assist the voice recognition circuitry in selecting the proper text output for a given voice sample data input (*both* sound recording and camera recording of lip *motion*, in *combination*).

In a further embodiment, the frontal lip first camera may involve a light source mounted adjacent to the camera on the surface of the pivoting bail band which is proximate to the lips, the central beam of the light illuminating the lip surface. In this case, if the chip is a low light level, "infra-red sensitive" chip, then the optimum light source would be an LED that emits most of its light in the near IR in a bail band that closely matches the sensitivity bail band in the near IR of the camera chip. This provides a light source that does not emit significant visible light, which might present an "odd appearance" when the user is speaking, and yet is of such a low intensity that the user will not be aware of any zonal heating effect by the IR source.

In a further embodiment, the light source may have a variable intensity output. The illumination intensity and the "gain" of the amplifier for the chip camera output signal would be varied to achieve a "best picture" of the lips. Because of the increased blood supply to the lips, it could be expected that a "white" IR image of the lips would be available, in contrast to the darker surround of the facial skin and interior of the mouth (teeth, tongue and cavity). The contrast of the lip picture would also be variable depending on other factors, such as lip covering (lipstick, or lip gloss and their IR reflectance characteristics as well as facial hair, such as beard or mustache).

In a further embodiment, a system is provided for recording the settings of the illumination source and video gain of the frontal first camera for an individual user so that the system will adjust said source and video gain for the first camera whenever that user again uses the system. The head worn VR enhancing device may be used by several people, but in any case, the system may be configured to "remember" the settings of illumination light intensity and camera gain so that an optimum lip picture may be available when the device is worn. The name of the user would normally be recorded by the system when "training" the voice recognition (VR) system occurs, so that the illumination or gain settings can be cataloged for each user.

In a further embodiment, the lens of the frontal lip first camera may allow a view of the lip area, nominally a circular area about 1½ inches in diameter.

In a further embodiment, a second camera may be mounted on the bail band adjacent to the first camera which provides a wide angle view of the lip area, nominally a rectangle 1¼ inch high by 3½ inch wide centralized on the lips. The camera lens may be anamorphic so that the desired scene area (the user's lips) can be imaged onto the ⅐th inch chip.

In a further embodiment, the output of the first lip camera may provide visual images of the moving lips which can be displayed at user option on an associated computing device for review. The images may be recorded as a video data stream, and time-associated with a record of the spoken words, for selected review by the user. The image produced by the camera can be displayed on any convenient computer screen or PDA screen so that the user can see the frontal lip image and may then adjust the illumination or camera video gain to enhance the picture. The user may view his lip image during VR training trials or actual VR system use, but it may be heavily distracting. A "display of output text" is temporarily converted into a display of the various lip pictures from first, second and third cameras.

In a further embodiment, the output of the first lip camera may provide visual images of the moving lips which is displayed at user option on an associated computing device for review. The images may be recorded as a video data stream, and time-associated with a record of the spoken words, for chosen review by the user.

In a further embodiment, the output of the second lip camera may provide visual images of the moving lips which is displayed at user option on an associated computing device for review. The images may be recorded as a video data stream, and time-associated with a record of the spoken words, for chosen review by the user.

In a further embodiment, a third camera may be mounted on the pivoting bail band at a location on the side of the bail band toward the face and lateral to the lips, at either left or right side. The third camera may be used to provide a silhouette view of the lips from the side, to estimate the protrusion or other "forward-back" motions of the lips during speech.

In a further embodiment, an illumination source may be mounted on the side of the pivoting bail band which is opposite to the location of the second camera, wherein the illumination falls upon the interior surface of the pivoting bail band so as to provide a backdrop illumination for the first lip camera. The backdrop illumination for the second "silhouette view" of the lips may be provided by, for example, an IR emitting LED, such as the one used for frontal illumination for the first, ie, frontal camera. This backdrop illuminator gives a high contrast image of the front-back and vertical movement of the lips during speech, to give further "lip reading" data input to the VR system. This IR source LED may be placed so that it "sprays" the inside of the bail band with light; thereby perhaps becoming the backdrop source for this second camera. Illuminator source may be located on the opposite side of camera three so as to provide an illuminated backdrop for the imaging.

In a further embodiment, a system is provided for adjusting the illumination level provided by the illumination source and the video gain of the first lip camera so as to provide an optimum silhouette view of lip movement during speaking. This may be configured as an electronics and software function.

In a further embodiment, a system is provided for recording the settings of the illumination source and video gain for an individual user so that the system will adjust said illumination source and video gain for the first lip camera when that particular user next employs the equipment. The system may provide that after a user identifies himself/herself to the system and brings up the stored data banks for that user (which couple the data channel inputs to text output) that the system also initialize both camera gains and illumination source levels to the previously determined "optimum" levels. This may be configured as an electronics and software function.

In a further embodiment, the output of the third lip camera may provide visual images of the moving lips which is displayed at user option on an associated computing device for review. The images may be recorded as a video data stream, and time-associated with a record of the spoken words, for chosen review by the user.

In a further embodiment, a system for recording the optimum amplification settings is provided for the microphone or array of microphones whose values are set for an individual user. The gain values used with the microphone determine the signal level delivered to the voice recognition circuitry, and the signal level may have a significant effect on "optimum recognition".

In a further embodiment, a system is provided for setting the amplification settings so that the microphones provide optimum input levels for a particular user. The voice recognition system should be initialized for "training" sessions, and the same amplification should be automatically provided whenever that particular user "goes on" the system, so as to insure the repeatability of the voice recognition system performance for each subsequent session, either for training or actual voice transcription.

In a further embodiment, the pivoting bail band includes a high frequency sound emitting source is mounted on the bail band in a central location on the face side of the bail band so that the emitted sound is directed towards the lips. Herein, an ultrasonic emitter may be mounted near the lips so as to emit sound into the vocal cavity whenever the opening of the lips and teeth permit it. This may be a steady, unmodulated sound in the 38 KHz frequency region, but it can be of much higher frequency, up to 100 KHz, for example. The injected sound may be used to "explore" the vocal tract by detecting the ultrasound as it emits from the vocal cavity. This emitter may be situated in the electronic ensemble containing the microphone or microphone array and first and second camera. In a further embodiment, the emitted sound is of nearly constant ultrasonic frequency. The frequency of the emitted sound may be adjusted for optimum probing of a particular user's vocal tract, and this frequency setting may be stored for use whenever that particular user again uses the bail band system for voice recognition. The oscillator and driver amplifiers may be part of the micro-circuitry ensemble mounted on the bail band. Some of the speech elements that are particularly susceptible to ultrasonic probe analysis are glottal stops and other gutteral sounds in which the throat is intermittently narrowed, and little beyond plosive stop sounds are used to convey the "glottal stop" sound, and this sound is difficult to record and thus is hard to provide for proper voice recognition for translation to an accurate text record of what was said.

In a further embodiment, the emitted sound may be automatically altered so as to vary continously between a lower and an upper ultrasonic limit frequencies. The vocal tract may be examined using a sweep of ultrasound frequencies, as between 38 and 44 kHz, so that vocal tract resonances at various ultrasonic frequencies are easy to measure. If the specific frequency range is optimized for a particular user, then those frequency sweep values would be recorded for re-initializing the system when next the user puts on the bail band.

In a further embodiment, a separate receiving microphone for ultrasonic frequencies may be provided on the central portion of the bail band, on the side closest to the face, so that ultrasounds emitting from the vocal tract are converted into electrical signals.

In a further embodiment, if the chip microphones cannot efficiently convert ultrasonic sound energy in the 25 KHz and above regions to an electrical signal, then a microphone designed to be efficient at frequency above this (typically 28 kHz to 50 kHz) may be provided, along with an output amplifier as part of the microelectronic ensemble previously mentioned. A "sonic probe data" may be arranged as an input to the voice recognition logic processing equipment.

In a further embodiment, the ultrasound generation may be conveyed to an emitter placed on the bail band and a reflected signal from the vocal tract is recovered by a microphone. An electronic mixing module is provided wherein a signal representing a frequency close to the generated ultrasonic frequency is mixed with the received energy from the vocal tract so as to downconvert the received sound from the vocal tract to provide audible sound, even when the speaker is not using vocal fold modulation during speaking. This mixture of received ultrasound from the vocal tract with an electronic signal nearly the same as the emitted ultrasound signal may produce a combination of signals, primarily two, one with a frequency range almost double the fixed ultrasonic probe frequency, and a second signal which is almost within the normal range of voiced frequencies (0.1 to 15 kHz for example). This down-shifted output sounds much like "whispered speech" and can be recognized by listeners as to the speech content, even though the speaker was not vocalizing the speech (vocal fold sound modulation "turned off"). The exact frequency of the additive ultrasonic signal may be shifted to make the whispered speech output sound "more normal", but this is usually not a critical adjustment. This system may allow a person to use unvocalized or nonvocalized speech as a substitute for vocalized speech, such as in a crowded call center, or just as a means for "saving the voice" of the speaker (as with laryngitis or just general fatigue from speaking for a long time, as in a dry environment).

In a further embodiment, a downconverted signal may be used as input to a voice recognition system during system training on provided text, then in actual voice recognition operation, so as to provide a text transcription of the non-vocalized speech. This downconverted signal ("whispered speech") can be used as training for a voice recognition system, then the trained system can be used to provide a text record of the non-voiced speech.

In a further embodiment, the downconverted signal may be used as input to a voice recognition system during system training on provided text, or in actual voice recognition operation, so as to provide a data transcription of the non-vocalized speech so that a text-to-synthetic speech output can be provided. This downconverted signal ("whispered speech") can be used as training for a voice recognition system., then the trained system can be used to provide a data signal stream which can control a "text to speech engine", as those provided with IBM Via Voice, or the more recent offerings by Lucent Technologies which are less nasal sounding that those provided by IBM's text-to-speech software.

In a further embodiment, the downconverted signal may be used as a training input for a voice recognition system, aided by the processed video signal from the first lip camera. In a further embodiment, the downconverted signal may be used as a training input for a voice recognition system, aided by the processed video signal from the second lip camera.

In a further embodiment, the downconverted signal may be used as a training input for a voice recognition system, aided by the processed video signal from the third lip camera. Both the downconverted "whisper sound" audio signal and the processed video signals from the first, second and third lip cameras are used in training to associate known text which is spoken non-verbally by the system user so as to condition the voice recognition system to associate whisper sounds and lip camera video so as to deliver the correct text output.

In a further embodiment, a voice recognition system is provided which has been trained in recognition of the supplied text samples which are read by the user without modulation of the vocal folds and assisted by the processed video data streams from associated lip cameras is used in an actual voice recognition situation so that unknown text is recognized. The system may have a printed output of the recognized speech which was non-vocally delivered to the VR system. The use of non-vocalized speech may be, of course, help to those who must spend hours on the telephone for their daily work, those who have laryngitis, or those in call centers in which the voices of many, many voice operators causes a high background noise level.

In a further embodiment, the trained voice recognition system in which the recognized data output is converted by a text-to-speech software program to emit vocalized sounds. This vocalized speech output system would be useful in a call center or other location so that the overlong use of voiced speech is not necessary, but vocalized speech with the same content is thus available for telephone messages and the like.

BRIEF DESCRIPTION OF THE DRAWINGS

FIG. 1a shows an exemplary embodiment of the bail band via a top view.

FIG. 1b shows an exemplary embodiment of the bail band via a side view.

FIG. 2a shows an exemplary embodiment of the bail mounting equipment via a top view.

FIG. 2b shows an exemplary embodiment of the bail mounting equipment via a side view.

FIG. 2c shows an exemplary embodiment of the bail mounting equipment via a top view.

FIG. 3a shows an exemplary embodiment of the bail position detent via a side view.

FIG. 3b shows an exemplary embodiment of the bail position detent in an enlarged view.

FIG. 5a shows an exemplary embodiment of the bail position swing arm via a side view.

FIG. 5b shows an exemplary embodiment of the bail position swing arm and headphone frame pads.

FIG. 6a shows an exemplary embodiment of the bail mounted cameras via a top view.

FIG. 6b shows an exemplary embodiment of the bail mounted cameras in an enlarged view.

FIG. 6c shows an exemplary embodiment of the bail mounted cameras via a side view.

FIG. 8a shows an exemplary voice recognition system employing an exemplary embodiment of the bail band.

FIG. 8b shows an exemplary voice recognition system employing an exemplary embodiment of the bail band.

FIG. 8c shows an exemplary voice recognition system employing an exemplary embodiment of the bail band.

FIG. 8d shows an exemplary voice recognition system employing an exemplary embodiment of the bail band.

DETAILED DESCRIPTION

Figure 1C:
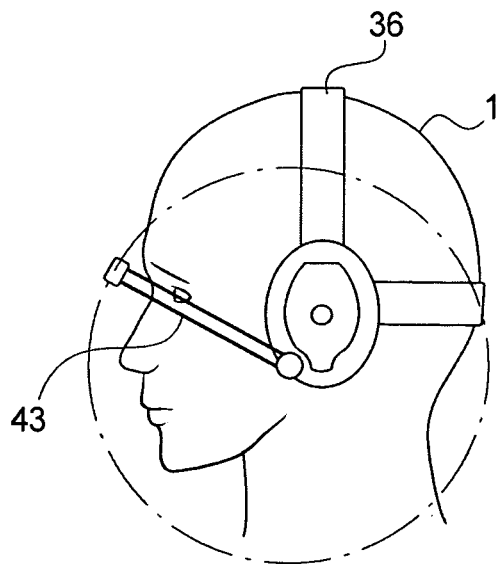
FIG. 1c shows an exemplary embodiment of the bail band via a side view.
Figure 1D:
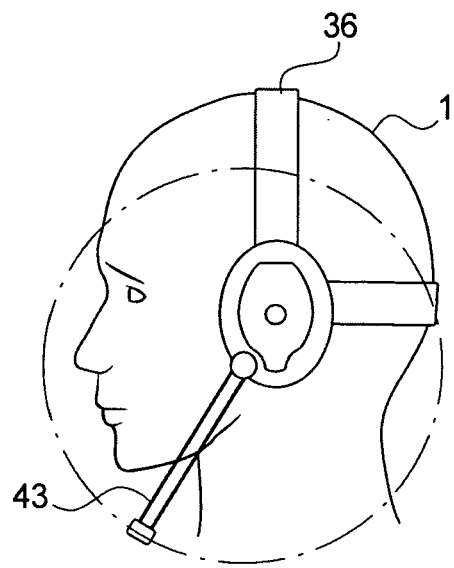
FIG. 1d shows an exemplary embodiment of the bail band via a side view.
Figure 4A:
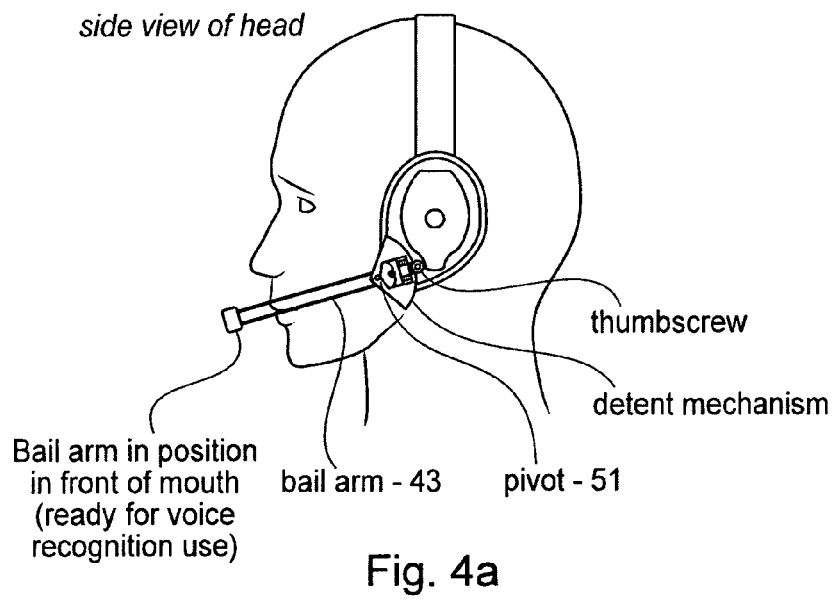
FIG. 4a shows an exemplary embodiment of the bail position swing arm via a side view.
Figure 4B:
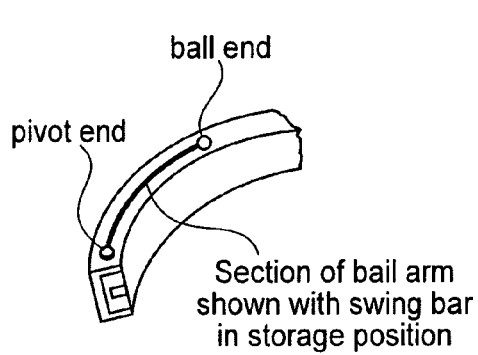
FIG. 4b shows an exemplary embodiment of the bail position swing arm in an enlarged view.
Figure 4C:
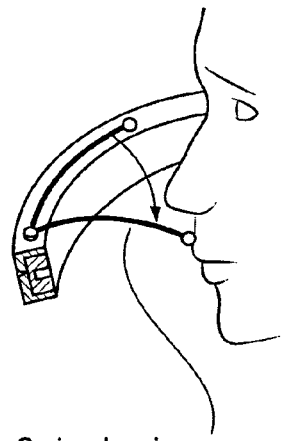
FIG. 4c shows an exemplary embodiment of the bail position swing arm in an enlarged view.

FIG. 1 shows a mechanically stable, head worn positioning of the microphone. An exemplary microphone positioning system is shown. This system employs a "bail band" 43 that extends around the lower face and whose two ends are pivotally mounted on opposite sides of the head. The location of the pivot points 51, 54 should be chosen so as to be repeatable. Thus, when the user removes the head worn apparatus and later replaces it, the pivot points 51, 54 should be relocated on the sides of the head with good accuracy. This may be achieved if the pivot points 51, 54 have a mechanical relationship with the external fleshy process or "pinna" of the ear. Since many people wear corrective or sun glasses and utilize the top portion and upper rear quadrant of the pinna for positioning, it is good practice to avoid using this top portion for positioning other devices, either the earphone itself, or the bail end pivots 51, 54. This may still allow the rest of the pinna's periphery for position location (see FIG. 5 in which two pads 412, 414 are used around each ear). The ends of the positioning system should be padded or otherwise provide for comfortable contact with the scalp or skin of the head.

The earphone 7 can be mounted on the positioning system either close to the ear canal ("closed" headphones) or positioned as much as ¼ inch away from the ear canal so as to permit hearing environmental sounds, that is, "open headphones". The user may also chose to have an active earphone 7 only on one ear or on both. If only one earphone 7 is used, a pad is used on the other side. This earphone 7 may be close to the ear canal, since environmental hearing will take place in the other ear. Some audio systems produce "stereo" or "binaural" sound channels (two or more), so that for full use of this capability, earphones 7 would be provided for both ears. Once a reliable head positioning for the earphones 7 is provided, the bail end pivots 51, 54 may be located in relation to the headphones. Note that by providing mounts extending from the earphone frames, the two bail pivot positions may be placed on the earphone frame 25 (see FIG. 3a). The bail 43 should extend from the side of the head and of a size so that the bail center is positioned a nominal one inch from the user's lips. The bail 43 then continues around the face and mounts to the other pivot point 51, 54 on the opposite side of the head. Arranging for a bail pivot 51, 54 allows the user to radius the bail arm 43 up or down, so that it is out of the way during eating, drinking, or in some cases, phone conversation. In a well-equipped office, the "voice recognition" earphone and microphone may be used to conduct telephone conversations, as this allows "hands free" telephone conversations. However, the voice recognition user may well wear the headphone-microphone device while away from the immediate desk area, so that to use another telephone handset will require that the microphone mounting bail 43 be radiused up or down so as to be out of the way when that telephone handset is used (see FIG. 1). So that the bail 43 may be properly positioned in relation to the mount, it may be possible to provide "detents" on the pivots 51, 54, so that there is a clearly established mechanical "home" position for the bail.

In a further embodiment, a small pivot arm may radius out from the top or bottom of the bail arm 43 that will allow the user to easily and accurately position the bail arm 43 in relationship to the lips, after which, the bail detents are "locked down" (see FIG. 3). This may allow a high degree of repeatability in the positioning of the microphone in relation to the user's lips.

Even though the microphone is mounted approximately one inch in front of the user's lips, environmental sounds may tend initially to confuse the recorded speech. To help with the environmental noise problem, it would be usual to provide a sampling port adjacent to the microphone 310 (mounted on the front side of the bail 43, away from the user's face), to provide a "noise-canceling" data input. In practice, the front "environmental microphone" sound signals are combined using a 180 degree phase difference with the rear "speaker sound microphone" signals so that a nearly "clean" user speech signal is obtained. See FIG. 2c. It is also possible to use two microphones 310, in which the noise sampling microphone faces forward away from the user, and the pickup microphone faces the user. The front "noise pickup" electrical signal is electrically subtracted from the rear "speech pickup" electrical signal.

Because the sound pickup microphone 310 is so close to the lips, a "blast shield" 314 may be provided which keeps direct breath from activating the microphone 310. See FIG. 2c. A typical "blast shield" 314 may be constructed of a layer of porous plastic foam. Sound signals diffuse through the foam layer, but direct breath noises are absorbed or reflected from the foam layer.

Since modern microphones are miniaturized, the bail arm itself may be quite narrow, as a examples, a ¼ inch round tube or a ¼ by ¼ inch square tube. Additionally, the bail arm 43 may be constructed of translucent plastic or a metal tube, so that its visual size is minimized. This design may be appealable to people who are style conscious and would not want to wear a visually "bulky" bail arm in front of the mouth area.

Of course, if the manufacturer wants to appeal to a younger, "trendy" crowd, the bail arm 43 can be designed to emulate a mouth guard bar on a sports (as, football) helmet, complete with choices of team decals or other colorations. In this case, the bail bar 43 could be quite large in comparison with the "style conscious" minimum size bail arm 43 discussed in the previous paragraph. Since the bail arm 43 is pivotable, the wired connections to the microphone 310 must be flexible as they extend to the earphone to join the earphone circuit wires. While sliding electrical contacts could be used, it is likely that flexible wires "which go around" the pivot will provide a better, less noisy circuit connection.

A further embodiment of the present invention may provide physical wires to connect the head-mounted earphone/microphone circuits to a computer or telephone circuits. As "local wireless" (using data linking integrated circuit logic chips) becomes more widely used, it will be possible to provide a wireless earphone/microphone link to a computer or cellphone body, and employ small internal batteries in the head worn equipment to provide power to the on-board transmitter/receiver chip(s). These chips may be part of a "local wireless" computing environment, or may be specifically used as part of a "smart cellphone" unit in which the user wears the earphone/microphone array for many hours of the day, and simply activates the computer/cellphone link to start "speaking and hearing".

Long life or rechargeable batteries may be used to facilitate this "wireless headphone/microphone" capability. Further, wireless connection to a head-mounted earphone/microphone device from a cellphone allows using the cellphone's transmitter circuits at a significant distance from the head, where tissue might be affected by the emitted radiation.

The provided earphone may be worn fitted into the ear canal, and a wire "dangles" down to a microphone in the approximate vicinity of the lips, and then extends on to connect to the cellphone. While this is a usable configuration, the dangling wires may easily catch on clothing or other objects, and may even pull the ear piece out of the ear canal. Thus, most users may readily choose to use the wireless head worn equipment, even with the nuisance of having to be aware of battery life arrangements.

These embodiments further may provide a stable microphone mount for the user, which allows good repeatability even if the head worn device is removed and then replaced, or is simply readjusted for convenience while eating, drinking or using a telephone handset. This stable, repeatable position for the microphone 310 means that the calibration achieved during the "training" sessions will be accurate for actual "voice recognition" sessions, ensuring the highest possible recognition accuracy which the logical algorithm software can provide. "Lip reading" cameras may be mounted on or in the bail arm 43 near pickup microphone 310.

For hearing impaired persons, visual observation of the speaker's lip positions may provide significant clues to what is being spoken. This lip reading augments "reclassification" of spoken words as to context to choose between possible alternatives. Some people have a "few second" mental playback capability which is employed to review recently spoken sounds to try to "fit them in contextually". To the extent that contextual review processing is employed, the listener will be "hearing" the review sound, not the presently spoken words, so that spoken information may be lost. Thus, while context review may be valuable, it can also take away portions of time from the listener's awareness of the stream of consciousness, ie, the word stream that a speaker is providing, so that data from the speaker may be overlooked by the listener.

Thus, to the extent that lip reading allows the listener to correctly recognize the spoken sound as it is being spoken, the review process is minimized, and a greater fraction of the spoken record is retrieved by the listener. "Lip reading" is useful to our correct hearing of spoken speech.

Figure 7A:
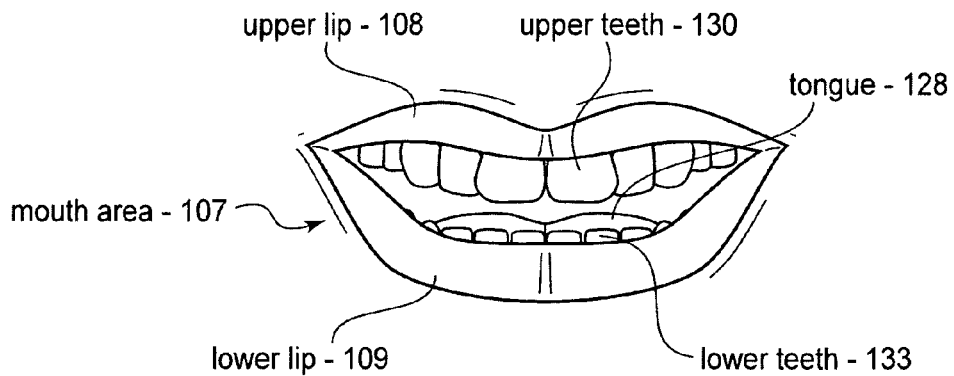
FIG. 7a shows an exemplary method of machine lip reading basics being used in an embodiment.
Figure 7B:
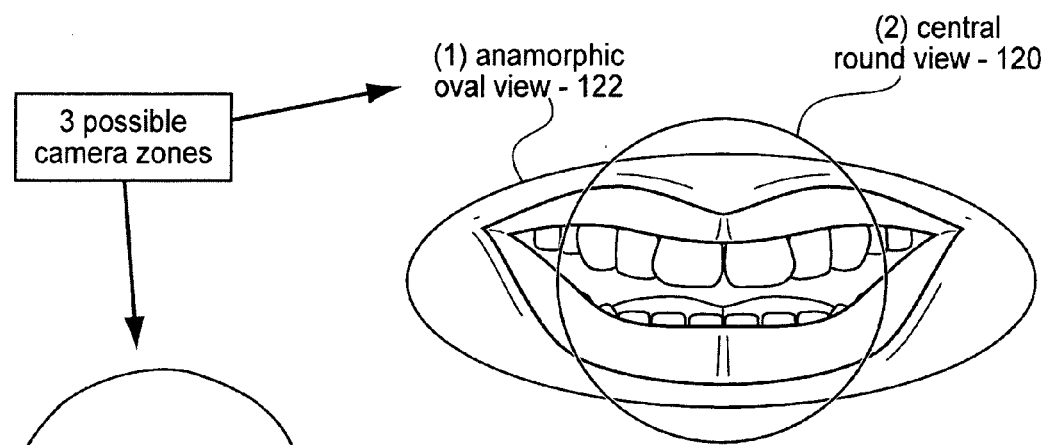
FIG. 7b shows an exemplary method of machine lip reading basics being used in an embodiment.
Figure 7C:
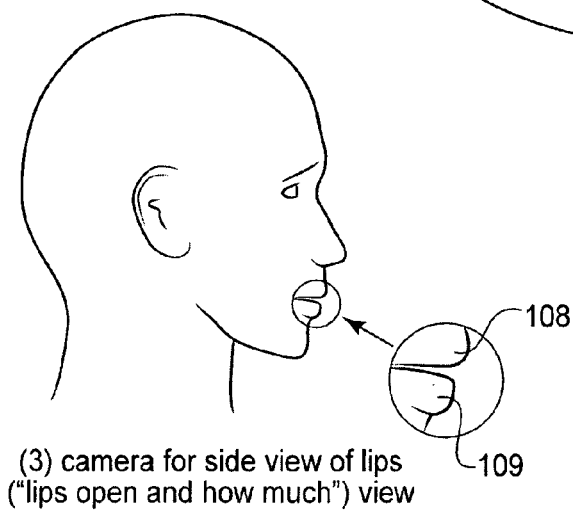
FIG. 7c shows an exemplary method of machine lip reading basics being used in an embodiment.

As shown in FIG. 7 *a*–*c*, an exemplary embodiment of the present invention involves mounting the cameras directly onto (or within) the microphone bail arm 43. The mounting system of the bail 43 is designed to position it accurately with respect to the user's lips 104 (see FIG. 6). The bail arm 43 provides a stable mount for the three cameras 120, 122, 132 presented in FIG. 7, two frontal cameras 120, 122 as in FIG. 7b, (one anamorphic camera 122 that looks at the whole mouth 107, and a center detail camera 120 that looks just at the middle quarter of the mouth 107). Lastly, there is a side camera 132 as in FIG. 7c (looking at just lip protrusion, as in lip 108, 109 pursing).

Having a stable mount for these cameras 120, 122, 132 means that no facial feature extraction is needed to "locate"

the proper areas for analysis. Modern chip cameras have gotten very small, and may be mounted directly onto or within the bail arm 43 itself. Should the desired camera be somewhat large for the desired bail arm 43 shape, it is also possible to mount the cameras 120, 122, 132 near the pivot point 51, 54 of the bail arm 43, and use an imaging fiber optic cable to transfer the optical image from the pickup point on the bail arm 43 to the light sensitive chip in the camera circuit. Further, it is now possible to utilize plastic fibers in the fiber optic cable, which will reduce the cost substantially. And, with modern optical processors, it is even possible to utilize fiber cables that were not collated in their manufacture (as in illumination fiber cables) by "collating" the output of each fiber by a new data address.

Of course, a simple illumination system, such as LED light sources will provide sufficient illumination light for the three cameras 120, 122, 132. The two frontal cameras 120, 122 may well work in the near infrared, so that a near infrared LED will be ample for illuminating the mouth 107. Because the distance between the bail arm 43 and mouth 107 is so short, it may be necessary to provide several LED light sources (say 4 or 5) across the mouth 107 width so that the anamorphic camera 132 is provided with enough light so that a solid video signal is obtained. In the case of the side mounted camera 132, at least two options are available. One may use a side reflective LED light source that is illuminating the lips 104 from the side (as in the near infrared) so that the source light reflects back to the side mounted camera 132. The other option is to provide an illuminated strip on the opposite side of the bail arm 43 so that the camera 132 is essentially looking at the obscuration of the lighted strip by the protrusion of the lips 104. As with the other illumination sources, it is likely that a near infrared LED source will be a good choice, since most miniature camera chips have very good sensitivity in the near infrared, as well as the visible. Of course, since "white" LED emitters are now available, one can provide visible band illumination for any of the three cameras 120, 122, 132, if this increases the quality of video data available for selective input to the voice recognition logic circuits.

The simplification of providing cameras to monitor lip 108, 109, teeth 130, 133 and tongue 128 positions during speech provides a whole new "data channel" to augment the present speech sound data channel for voice recognition. Thus, it may be helpful to present some expanded information about the "lip, teeth, and tongue" data channel's usefulness.

When machine voice recognition systems operate, they use voice input (analog signals) obtained by microphones placed adjacent to the speaker's mouth. The system then digitizes the voice samples, and uses various filtering and pattern matching algorithms to try to extract the written equivalent of what was said. Coaching trials in which the user reads canned written materials into the system precede the actual recognition passes to improve the accuracy with which the system retrieves written equivalents of what was said. The accuracy of the attained voice recognition varies, depending on many factors, stability of speech patterns by the user (who may have a cold or other temporary voice impediments), adequacy of the conversion algorithms, algorithmic processing capability (system compute power), and so forth. Some hearing impaired persons may learn to use lip 108, 109, teeth 130, 133 and tongue 128 tip positions (if visible) to assist in interpreting what is being said. Very expert lip readers can do quite well in estimating what vocal sounds would accompany the observed lip/teeth/tongue patterns.

A further embodiment provides that a form of machine lip reading using camera data take place to augment the analog voice recognition processing. The data obtained from the machine lip reading would serve as additional input "decision base" channels to aid the algorithmic processors to convert the spoken speech into written words. As before, the lip reading processors would use canned written materials that the user would speak aloud, acting as system training runs in which the recognition algorithms would be fine tuned for the particular user (or group of users, if the system is to be somewhat independent of specific speaker pattern file storage).

The actual lip reading would utilize one or more cameras mounted adjacent to the speakers lips. As shown in the attached FIGS. 6 and 7, three cameras 120, 122, 132 may be used. Modern camera technology permits using very small chip cameras. The cameras may be directly mounted on a bail bar 43 near the speaker's mouth 107, or the actual camera 120, 122, 132 may be mounted at a nearby location, such as at the speaker's ear, with a fiber optic relay used to bring the image from the pickup point to the camera 120, 122, 132. Since many chip cameras operate well in the near infrared, an illuminator, such as a LED near-IR emitter can be used as a light source. Selection of the specific infrared operating band wavelengths may assist in obtaining a quality optical record in being less influenced by ambient lighting, and may help bypass confusing elements, such as abundant mustache hairs.

FIG. 8 shows several variations of voice recognition systems. FIG. 8a shows a voice recognition system as it is presently used, with hand or head boom microphone input. The succeeding views present augmentation of the basic decision channels, using bail mounted cameras (view 8c) and sonic input data (view 8d).

It is expected that the camera one, an anamorphic view of the entire frontal area of the mouth 107, would not only pick up the moving lips 108, 109, but also the teeth 130, 133 and tongue 128 tip when they are frontally visible. Pattern recognition algorithms can extract lip movement, teeth movement and tongue tip movement from the observed photographic data.

Camera two may provide a high accuracy view of the central mouth 107 region, and might help to further quantify lip 108, 109 position, teeth 130, 133 position and tongue 128 position as correlate time records which would accompany the recorded speech samples as input for the voice recognition algorithmic circuitry.

Camera three may be positioned at the side of the mouth 107, and would be specifically designed to make a high accuracy record of lip 108, 109 movements, again to serve as additional data input to the voice recognition circuitry.

Since each camera channel represents an over abundance of data, the training sessions with the user must establish significant lip/teeth/tongue event sequences that can be quantized to represent discriminatory data helping the vocal analog speech microphone channels recognition algorithms to improve the accuracy of choice between competing alternative written elements.

As an example, when the user says the word one, a quick sequence of vocal events occurs . . . the user actually has three tasks in quick sequence . . . (1) saying "ooh" with pursed lips (medium pitch cavity resonant sound), then (2) "uhhh" (a lower frequency cavity resonant sound) and finally (3) "nn-uh" or "un-nah"—ending in a sudden closure. The "nn-uh" or "un-nah" sound is a brief resonant sound in a lower frequency band, but closed off by a movement of the tongue against the roof of the mouth at which time the ending sound has changed to an "uh" or "nah" sound, depending on speaker vocalizing habits.

The voice microphone can pick up the three sounds and classify them into formant band frequency zone regions and give some discrimination so that the combination of the three sounds will register in the output circuits as the written word "one" (note that it is not clear as to whether the word "one" or "won" will be the chosen output from the voice recognition logic algorithms, as that choice can only be made by context examination when only the vocal sound output is used for those logical decisions. However, by using the camera channels, the particular pursing of the lips may be examined. When saying "one", the lips are heavily pursed (lips forming an oh, but protruding as far as they normally ever protrude in a pursing). When saying "won", the pursing of the lips is somewhat less pronounced, and the pursed lips do not protrude as far as when saying the "one". That physical protrusion distance can be used to discriminate between outputting the written word "one" or the written word "won" in the output written equivalency record of the observed speech. A small pursing difference can be noted. For the machine voice recognition circuits, the very slight difference is the pursing extension of the lips between one and won, as the sound output records are essentially identical. Without additional data to augment the sound output data, the decision logic would only be able to choose between outputting one and won in the record by using linguistic proximity logic, a difficult and often incorrect method of making the choice. If the speaker is saying, "Well, there are two events . . . one, who won, and two, who lost". In that sentence, there may not be sufficient linguistic data available to make a firm choice of which words to output for words six ("won") and eight ("two") as a result of hearing only the voice sound record of that sentence.

In this pair of training cases (speaking the written words "one" and "won"), both camera channel one (frontal anamorphic camera channel) and camera channel two (central front close view) will pick up lip shape during the first sound fragment event to record that the lips are pursed in shape, with a small central opening for sound emission. However, it is likely that channel three (the side camera) will provide the best discrimination value between the lip pursing event for the start of making a one sound versus making a won sound. By recording this minute difference in the extent of pursing (the amount by which both lips protrude forward during pursing), this discriminatory data value can assist the speech recognition engine to correctly output the written word "one" versus the written word "won".

Consider the written words "two" and "to". Both are voiced starting with a plosive sound, in this case formed by placing the tip of the tongue 128 on the roof of the mouth 107, pulsing the diaphragm to form a burst of air and removing the tip of the tongue 128 from the roof. Next, the tongue 128 tip is replaced at the roof of the mouth 107 when the air burst ends. The second sound "ooo" is a formant or resonance sound formed by air cavity resonance which extends from the vocal cavity and to some extent, down into the chest.

Both words "two" and "to" sound very similar. When the figure "two" is spoken in isolation, it usually has a longer "ooo" formant resonance sound than does the preposition "to". However, when speaking a series of individual numbers, as "six, two, four and three", the vocalized sound for "two" is usually shortened to the same sound length as when speaking the word "to" (a preposition).

The present invention recognizes the lip 108, 109 pursing recognition to give the necessary input to determine a difference. When speaking the figure "two", the lips 108, 109 are more pursed during the plosive sound emission than when speaking "to". This extra pursing when saying "two" happens because persons are often more deliberate in sounding the figure, as it is harder to select from context than is the preposition "to". For example, when persons say "I'm going to the mountain", persons can severely slur the "to", and it may even come out "tuh" when spoken casually, because persons can examine content and will determine that the preposition "to" is what is meant despite the casual vocalization, since the figure "two" in "I'm going two the mountain" makes no sense logically. But, when persons say, "I will buy two of those!", persons usually emphasize the two because there is often no context to let anyone else know how many are desired . . . one, two, three, four, five, et cetera.

Thus, the lip pursing motions should be examined, as by camera three in particular (which looks at the dynamics of lip 108, 109 shape from the side so that lip 108, 109 protrusion during pursing is most observable). When lip 108, 109 protrusion is very prominent during the plosive sound emission, the recognition system can then know that the correct output word is the figure "two", not the preposition "to". Likewise, if significant lip 108, 109 pursing is not present, then the correct output word is "to". As discussed, the individual pursing calibration for a specific user 1 is done during trial text reading, aptly called a training session. Often, the output decision logic must force choices between very close-sounding alternatives. The words "waist" and "waste" are good examples of this close-sounding pairing. Both are comprised of "ooh" (resonant or formant sound) transitioning to "aaaye" (also resonant, but not as strongly so as "ooh"), followed by a white noise "ssss" (a hissing noise) formed by pressuring air to pass around the tongue while the tip of the tongue is touching at the frontal region of the roof of the mouth. The final vocal component is an almost glottal "tuh" plosive, again formed by touching the tongue to the roof of the mouth while a burst of air is emitted. Thus, both the words "waist" and "waste" are verbally comprised of almost exactly the same voiced elements. Usually, however, the word "waist" can have a somewhat longer "ooh" sound, and the lips usually form into a moderate purse shape during the "ooh" sound. However, when the word "waste" is spoken, the lip pattern is usually wider and less pursed. The difference is very subtle to the ears, but when examining the camera records of lip movement, as in camera three from the side (and to some extent, frontal observation of teeth and tongue movement by cameras one and two), the decision system can learn whether that a particular speaker does, indeed, vocalize the words "waist" and "waste" in a very slightly different physical manner (physical examination deals with the lip/teeth/tongue picture interpretation in contrast with to solely examining the vocalized sound patterns). When a person vocalizes "waist", there is an emphasis on the "ooh" sound slightly longer in comparison to when saying "waste", and the lip pursing is more pronounced for "waist" in that the lips make a slightly greater forward extension (pursing) during the "ooh-aaaye" sound transition. But when as person says the word "waste", the lips are more widely formed during the "ooh-aaaye" sound transition. Thus, by training on a person's vocalization movements as well as vocalization sounds, the recognition system can use the additional physical lip/teeth/tongue movement differences to correctly discriminate the occasions when the person is saying "waste", not "waist" (and vice-versa).

Some words are difficult to recognize (chose among alternatives) because they are produced by "deep" vocal mechanisms. As an example, the glottal stop "ch" as "chabad" or "channukah" (note that channukah is sometimes spelled without the C in written English, as "hannukah". Even with highly stable, head worn positioning of the microphones, it can be hard to recognize this guttural speech from the voiced sound alone, since it is basically a rush of air modulated by placing the tongue on the middle of the roof of the mouth and allowing air to rush up the windpipe. The guttural "ch" is not as sharp a sound as a plosive (as "teh" or a "tisk-click"), but in structure is similar to a sibilant, as in "ssss" which is formed by the tip of the tongue touching the front of the roof of the mouth. The "ch" resonance is deeper in the throat and has more pronounced resonances than do the plain sibilant sounds, as "sss".

While these "glottal stop" sounds are more common in other languages (Arabic and Hebrew, for example), our mixed US society has encouraged these words to creep into common usages (again, examples are "chabad" or "channukah", both from Hebrew). Thus, a voice recognition system should properly "handle" such guttural sounds, to minimize the amount of hand correction needed after the voice recognition system has done its best to correctly output text based on the spoken input.

It is possible to provide a third channel of information for the voice recognition logic circuits, that of probing the vocal tract with sound. Naturally, the probe sound has to be outside the frequency bands normally associated with speech. Infrasonic sound below, say, 50 Hz, could be used as a sonic probe of the vocal tract, but speakers that emit 50 Hz tend to be a bit large to mount on the bail arm 43. As miniature speakers improve at lower frequencies, the infrasonic probe of the vocal cavity can be considered. However, ultrasound, above the hearing range (30 KHz and above, for example) can serve well as a vocal cavity probe system. Here, the ultrasonic sound is projected into the vocal cavity from an emitter mounted on the bail arm 43, and, like the microphone on the bail arm 43, is pointed directly at the center of the mouth 107. When the mouth 107 opening permits, sound is injected directly into the vocal cavity. The vocal cavity acts to "modulate" or "shape" this ultrasonic energy, just as the vocal cavity acts to modulate or shape the sounds emitted by the vocal folds of the larynx.

While the ultrasound choice is made so that the speech pickup microphone will not necessarily have to respond to the probing sound, the ultrasonic resonances provided by the vocal tract muscle shaping are easy to detect by a microphone sensitive to these higher frequencies. In fact, many "voice range" microphones (condenser or electret microphones) have significant sensitivity above 30 KHz. Typically usable vocal cavity probe frequencies include a spectrum from, say, 35 kilohertz to 45 kilohertz. Note also that a region microphone (say, 50 Hz to 10,000 Hz) as used for picking up the user's voiced sounds, will not be sensitive to the probing ultra sound noise. But, by arranging the filter set after the microphone, it is often possible to use one microphone to pick up both the voice range frequencies and the ultrasonic probe "return" sounds. Thus, the only additional equipment needed on the bail arm 43 would then be an ultrasonic emitter. Since the emitted wavelengths are very small, the size of the ultrasonic emitter can be small, perhaps a cylinder ¼" in diameter, forming a tube perhaps ¼" long.

With the ultrasonic emitter mounted near the center of the bail arm 43, facing the mouth 107 will give a stable exploration arrangement, specifically, accurate targeting of the ultrasound into the vocal cavity when the potential lip/teeth/tongue obstructions permit.

While the mouth 107 is not always open, and the teeth 130, 133 and tongue 128 tip can obscure some of the lip opening when it is presented, yet it is often when these mouth region parts present an opening that represents exactly the time in which the extra analysis of vocal tract positioning would be most valuable to the voice recognition logic (to serve as further discriminatory data when making output word choices).

The present invention also provides ultrasonic ranging by providing a sharp time-edge to a pulse ultrasound wave and measuring the return time, much as a bat echo-locates for navigation and food source location. Such high response ultrasonic emitters and receivers are suitably small for mounting in or within the bail arm 43, along with the standard microphones and cameras previously mentioned. It is also favorable to consider an ultrasonic source which has a sweeping frequency characteristic, such as a linear sweep between 35 kHz and 45 kHz.

Pickup of the returned sound may demonstrate peaks and valleys corresponding to the cavity resonances of the vocal tract. In the case of ultrasonic probing of the vocal tract when doing a "deep" glottal stop sound, such as "chabad" or "channukah", the positioning of the tongue will give a very discernible pattern of peaks and valleys during the ultrasonic sweeps. Since the ultrasonic frequency sweeps reoccur quickly, say at least 20 times per second, the output peak and valley "resonance" patterns observed over a longer period will vary during the positioning of the vocal tract parts (as, during several seconds of speech).

This recognition task is exactly similar to the task of recognizing sound patterns from a 50 Hz to 10,000 Hz microphone for making algorithmic logical choices between spoken word parts. The voice recognition system can "parse" the dynamics of the ultrasound sweeps during speaker training trials so as to pick out vocal tract movements specific to the particular user. Since the adaptive recognition logic system has been trained by this individual user as to what patterns are available when "chabad" or "channukah" are spoken by the user, the system is thus "tuned" to that user's ultrasonic patterns, and will more often correctly output "chabad" or "channukah" when these words are vocalized.

Note that even when the spoken voice would normally produce a sound, it is possible to explore vocal tract patterns when the sound are unvoiced, as by "turning off" the vocal fold modulation. By using wider range ultrasonic probing and using the lip reading cameras, it will be possible to recognize "unvoiced" speech movements of the vocal tract with a good accuracy.

Probing the vocal cavity with sound as ultrasound allows exploration of the speech patterns of the user, even if the user is NOT using the vocal folds of the larynx to produce a "modulation carrier" or sound during speaking. The probe sound could be injected through the tissues of the neck, but wearing a neck device is usually considered uncomfortable. An ultrasonic probe set, ultrasonic transmitter and receiver, mounted on the bail arm would not be perceived as "uncomfortable" or "unusual" for the wearer. As mentioned previously, the vocal cavity can modulate injected sound just as it modulates sound generated by the vocal folds. When the probe sound to be modulated is coming from an external source (as on the bail arm 43), the user can quickly adjust their speaking patterns to (1) move vocal tract muscles but NOT vocalize; and (2) keep the lips, teeth and tongue somewhat more open during speech. This recognition of an unvoiced speech flow allows new modalities of "voice recognition" procedures. When people must speak in a very, very noisy environment, it is almost automatic that people will raise their voices, or slow down speech to emphasize the diction (the Lombard Effect, as purportedly described in U.S. Pat. No. 5,621,858, incorporated herein by reference with respect to its discussion of the Lombard Effect). This is an extra effort for the speaker, and one that is often very tiring. When one does not vocalize speech (NOT using vocal fold modulation, but still voicing the speech, that is quickly learned in the manner of an easy "parlor trick"), it is my own observation is that the tendency to raise level, as with the Lombard Effect does not occur, since no vocalization is occurring.

Thus, the user may quickly find that the vocalization effort (here, only to position the speaking musculature in the vocal tract, but vocal fold modulation) results in a lower level of "vocal effort". During a long day of vocalization events, this effort reduction is very pleasant for the user. Note that someone who has laryngeal difficulties (temporary, as in laryngitis, or permanent, as after surgery from cancer or smoking) may utilize this non-vocalized speech recognition to communicate with others using the text output of the voice recognition logical circuits, or even using the data output to produce synthetic vocalized speech (as with "text to sound" programs).

Also, since no vocal sounds are produced, in an office in which many worker cubicles or "bull pens" require that workers are seated quite close together, no vocalization means no sound is emitted that disturbs the people next to the worker. If the workers are already wearing voice recognition equipment (the headphone and bail arms as presented earlier), the option for using non-vocalized speech is now available. In some offices, the "noise pollution" by many, many people speaking in close proximity causes stress, and that the office outfitter will often use "white noise" or other masking sounds which are generally broadcast throughout the working area to reduce the transitory impacts of speech sounds by adjacent work partners.

As an assist to automatic recognition of (non) vocalized speech, a continuous ultrasonic emitter should be mounted on the bail arm 43. If reexamination of the vocal tract is in use, then the ultrasonic frequency used by an adjacent continuous ultrasonic emitter should be non-conflicting, so that if the sweep frequency band were to be 35 kHz to 45 kHz, the continuous emitter could use 64 kHz. Note that the ultrasonic emitter must be reasonably linear in its response pattern, such that no significant sub-harmonics are present to interfere with the adjacent sweep frequency ultrasonic probing. When a "steady state" continuous sound emitter is injected into the vocal tract, it will be modulated in about the same manner as if it were sound emitted by vocal fold modulation. Historically, this has been used for special effects. Here, throat-mounted speakers that inject sound into the vocal tract through the tissues of the throat are used. The most notable example is the "Bromo Seltzer Train" commercial in which the sound of a steam train was injected into the throat cavity through the walls, and the speaker is saying "Bromo Seltzer, Bromo Seltzer" in about the same time rhythm as the engine noises. The result "sounds like" a train saying "Bromo Seltzer, Bromo Seltzer". For horror movies, the ghost's voice would be vocalized using the throat-wall injected sound of a metal button slid across a metal screen. This re-modulation of externally-injected sound causes a very disturbing sound, since it is not a sound one could hear in nature.

The user can easily learn to "psuedo-vocalize" (that is, speak without use of the vocal folds) and in addition, to speak in a manner that allows the front of the mouth to be open (lips and teeth somewhat open, and tongue tip held to the rear as much as possible). When this is done, a frontally-injected ultrasonic sound beam will be modulated by the vocal cavity.

The resulting modulation can be picked up by a microphone with a band filter that restricts the input to a frequency region that surrounds the "beam frequency". Thus, if a 64 KHz beam frequency is used, then the filter would be set to pick up sound energy in a 54 to 74 kHz region (plus or minus 10 kHz the beam frequency, where 10 kHz is the approximate "voice frequency range of interest"). While "single sideband" detection can be used (then a pass band of say, 60 to 74 kHz could be used), single sideband detection can introduce some distortion in the recovered "speech waveforms". The output of the demodulator, the recovered "speech waveform" would then serve as direct input to the usual voice recognition algorithm circuitry. The goal, of course, is to produce a satisfactory written record of the (non-voice) "spoken" words. Of course, one is really producing a record of the vocal tract physical speech motions, but this "recovered speech" is of sufficient quality to properly trigger voice recognition algorithmic decision logic. Also, it is expected that the user would train the voice recognition system using non-voiced speaking, and this would produce a sufficiently trained voice recognition system.

The recovered voice signal can be used for transmission over standard telephone circuits, but the listener will recognize that the "recovered voice" sounds "strange", somewhat similar to the vocalization that is produced by "text to speech" algorithms used for voice simulation in computer-to-human communications. Much of impression of human "personality" in voice is obtained from the variations in vocal fold modulation, but some is gained by how persons shape their vocal cavities. There are over 29 muscles involved in this vocal tract shaping, controlled by a high precision area of movement control in the brain, called "Broca's area". If this high precision motion control area is fundamentally damaged, as by a wound, the central commisure pathway in the brain will slowly try to form an alternate "Broca's area" on the undamaged hemisphere, but this reconstruction may take up to a decade, and it is unusual for the brain to make a wholly satisfactory reconstruction of function in the alternate hemisphere.

The recovered voice obtained by using an ultrasonic probe beam will have some degree of intonation modulation because we do shape the vocal tract for intonation and most "text to speech" voice sounds have no intonation modulation. However, since the probe beam sound emission is constant, some of the spoken "start-stop" aspects of speech are missing in the recovered speech record.

Of course, in normal speech, persons not only shape the vocal cavity musculature, but in addition persons shape our vocal fold sound output which, of course, is used in non-vocalized speech. Thus, it should not be expected that the recovered sound will be "natural", but the test here is "intelligibility" (ability to recognize the parts of speech so as to understand the information content) rather than testing for "personality patterns" in intonation.

Figure 9A:
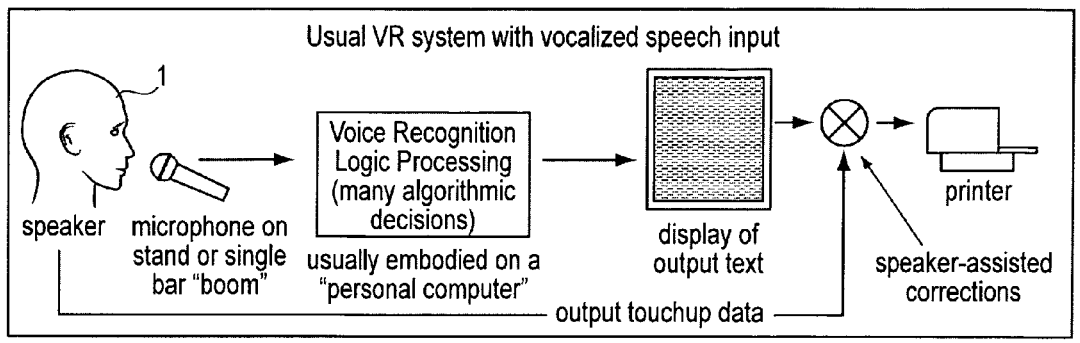
FIG. 9a shows an exemplary system for recognizing non-vocalized speech employing an embodiment of the bail band.
Figure 9B:
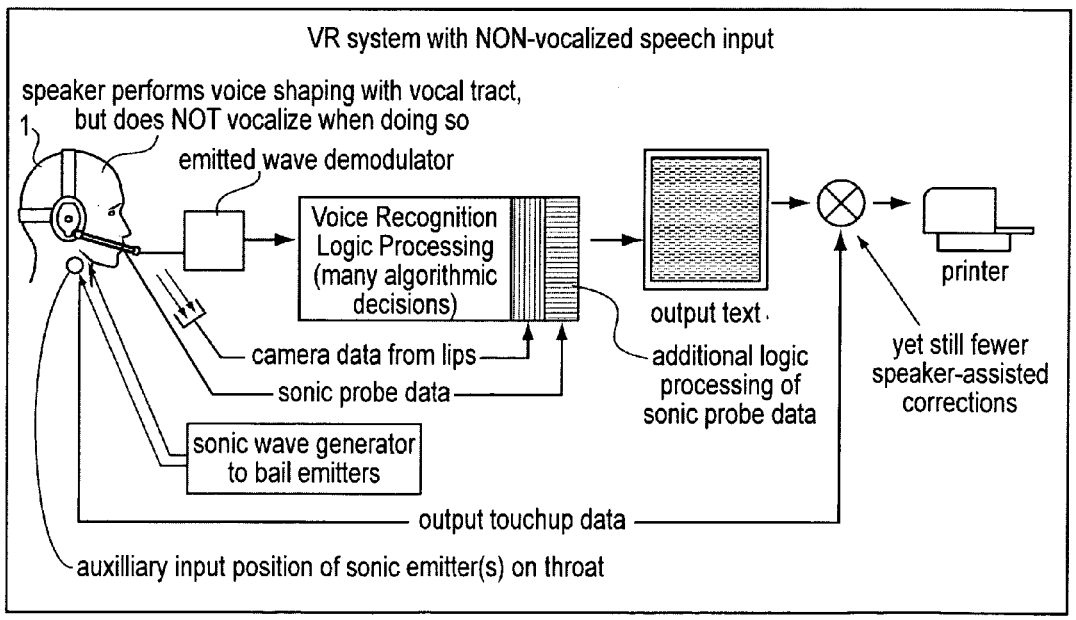
FIG. 9b shows an exemplary system for recognizing non-vocalized speech employing an embodiment of the bail band.

The simulated speech produced from the voice recognition elements as recognized by the system may be augmented by presenting the demodulated sound output of FIG. 9B, either as an alternative input, or as a binaural presentation if the "sound data" is going to a human listener (either with the printed output, or without it). This allows the recovered speech to be intelligible to another person when the speaker cannot vocalize sounds (as from injury or temporary incapacity, such as laryngitis).

What is claimed is:

1. A head-worn apparatus comprising:
   a bail band configured to pivot, the bail band being wearable on a user's head using the user's ears as reference points for pivoting; and
   a reference bar having a predetermined length is pivotable from at least one of the first end and the second end of the bail band, the reference bar being positionable directly in front of the lips of the user;
   wherein at least a first pivot point on the bail band is situated opposite a second pivot point on the bail band so that stable measurements made of at least one of sound data and spoken data are recognizable by a device;
   wherein the first and second pivot points are manipulatable by the user so that the bail band can be situated directly in front of lips of the user to get a best record of spoken word emitted from the lips; and
   wherein at least one of the first pivot point and the second pivot point is adjustable to provide and fix to any desired distance between the lips of the user and the bail band.

2. The head-worn apparatus of claim 1, wherein the first and second pivot points include ear surround pads.

3. The head-worn apparatus of claim 1, wherein the first and second pivot points are configured to be used to pivot the bail band repeatedly near at least one of the lips of the user, a forehead region of the user, a chin of the user, and a physical location away from the lips of the user, so that the bail band is configured to be movable away from the lips and back near the lips in a previous position.

4. The head-worn apparatus of claim 3, wherein the bail band has a length and a shape to allow the bail band to be pivoted near a user head region so that sufficient clearance is available between the bail band and the user head region.

5. The head-worn apparatus of claim 4, wherein the user head region is at least one of the lips of the user, the forehead region of the user, the chin of the user, an eyewear worn on the head of the user, a headwear worn adjacent to an eye of the user, and a computer vision accessory worn on the head of the user.

6. The head-worn apparatus of claim 4, wherein the bail band includes a first end situated near the first pivot point and a second end situated near the second pivot point, the bail band being pivoted near the user head region by adjustment of the first and second ends of the bail band.

7. The head-worn apparatus of claim 1, wherein the reference bar includes a first reference bar end and a second reference bar end, where at least one of the first reference bar end and the second reference bar end is at least one of a rounded surface, a smoothed surface, and a spherical-shape end.

8. The head-worn apparatus of claim 7, wherein the reference bar is pivotable at an orthogonal angle and at least one additional angle in reference to a frontal region of the bail band, a maximum distance between the reference bar and the lips of the user being achieved when the reference bar is pivoted at the orthogonal angle.

9. The head-worn apparatus of claim 8, further comprising a swinging bar being pivotable from a region near a center of the reference bar, the center of the reference bar being situated between the first reference bar end and the second reference bar end.

10. The head-worn apparatus of claim 8, wherein the bail band is constructed of at least one of thin material and translucent material so as to at least one of present minimum visual apparent size when the reference bar is in use and position the reference bar essentially parallel to the frontal region of the bail band when the reference bar is being stored.

11. The head-worn apparatus of claim 1, further comprising a microphone disposed in a central region on the bail band and being pointed toward the lips of the user.

12. The head-worn apparatus of claim 11, wherein the bail band is configured augmented in which any sound pickup from a direction away from the lips effectively provides cancellation of adjacent noise by at least one of mechanical subtraction and electronic subtraction.

13. The head-worn apparatus of claim 11, wherein the microphone includes a porous cover of at least one of foam and wire so that the microphone is protected from any undesired projection from the lips.

14. The head-worn apparatus of claim 11, further comprising a first camera, the first camera being disposed on a nearly central location on a lip side of the bail band, the lip side of the bail band being that part of the bail band closest to the lips of the user, wherein the first camera is positioned towards the lips so as to provide a frontal lip camera view.

15. The head-worn apparatus of claim 11, further comprising a system for setting amplification settings so that the microphone provides optimum input levels for the user.

16. The head-worn apparatus of claim 1, wherein the bail band is formed to utilize at least one specific regional shape of a head of the user as at least one reference point from which to mount at least one of the first pivot point, the second pivot point and another pivot point, so that the bail band is configured to be repeatedly placed on the head in a manner allowing a precise positioning in reference to the lips of the user.

17. A head-worn apparatus comprising:
   a bail band configured to pivot, the bail band being wearable on a user's head using the user's ears as reference points for pivoting, and
   a plurality of individual microphones disposed in a central region on the bail band and being pointed toward the lips of the user, each individual microphone of the plurality of microphones having respective phase-adjusted output signals to provide an accurate pickup of spoken word from a region near the lips of the user;
   wherein at least a first pivot point on the bail band is situated opposite a second pivot point on the bail band so that stable measurements made of at least one of sound data and spoken data are recognizable by a device.

18. The head-worn apparatus of claim 17, wherein the first and second pivot points are manipulatable by the user so that the bail band can be situated directly in front of lips of the user to get a best record of spoken word emitted from the lips.

19. The head-worn apparatus of claim 18, wherein at least one of the first pivot point and the second pivot point is adjustable to provide and fix to any desired distance between the lips of the user and the bail band.

20. The head-worn apparatus of claim 17, wherein the individual microphones of the plurality of individual microphones each include a porous cover of at least one of foam and wire so that the plurality of individual microphones is protected from any undesired projection from the lips.

21. A head-worn apparatus comprising:
a bail band configured to pivot, the bail band being wearable on a user's head using the user's ears as reference points for pivoting;
a first camera, the first camera being disposed on a nearly central location on a lip side of the bail band, the lip side of the bail band being that part of the bail band closest to the lips of the user;
a microphone disposed in a central region on the bail band and being pointed toward the lips of the user; and
a light source disposed adjacent to the first camera on an outer surface of the bail band, so that a central beam of the light source illuminates a surface of the lips of the user;
wherein the first camera is positioned towards the lips so as to provide a frontal lip camera view; and
wherein at least a first pivot point on the bail band is situated opposite a second pivot point on the bail band so that stable measurements made of at least one of sound data and spoken data are recognizable by a device.

22. The head-worn apparatus of claim 21, wherein the light source is configured to provide a variable intensity output.

23. The head-worn apparatus of claim 21, further comprising a system for recording settings of the light source and of any video gain of the first camera for the user so that the system adjusts the light source and the video gain of the first camera when the user again uses the head-worn apparatus.

24. A head-worn apparatus comprising:
a bail band configured to pivot, the bail band being wearable on a user's head using the user's ears as reference points for pivoting;
a microphone disposed in a central region on the bail band and being pointed toward the lips of the user; and
a first camera, the first camera being disposed on a nearly central location on a lip side of the bail band, the lip side of the bail band being that part of the bail band closest to the lips of the user;
wherein the first camera is positioned towards the lips so as to provide a frontal lip camera view;
wherein at least a first pivot point on the bail band is situated opposite a second pivot point on the bail band so that stable measurements made of at least one of sound data and spoken data are recognizable by a device; and
wherein the first camera includes a lens having circular area with an about 1.0 inch to about 1.5 inch diameter.

25. A head-worn apparatus comprising:
a bail band configured to pivot, the bail band being wearable on a user's head using the user's ears as reference points for pivoting;
a microphone disposed in a central region on the bail band and being pointed toward the lips of the user;
a first camera, the first camera being disposed on a nearly central location on a lip side of the bail band, the lip side of the bail band being that part of the bail band closest to the lips of the user; and
a second camera, the second camera being disposed on the bail band and being adjacent to the first camera, the second camera viewing at least one of a wide angle view of the lips and an about rectangular area having an about 1.25 inch height and about 3.50 width so that the lips are central in the about rectangular area;
wherein at least a first pivot point on the bail band is situated opposite a second pivot point on the bail band so that stable measurements made of at least one of sound data and spoken data are recognizable by a device; and
wherein the first camera is positioned towards the lips so as to provide a frontal lip camera view.

26. The head-worn apparatus of claim 25, wherein an output of the second camera provides visual image of the lips moving, the second camera output being displayable at user option on an associated device for review.

27. The head-worn apparatus of claim 26, wherein the visual image of the lips is recordable as at least one of a video data stream and a time-associated recording of any spoken sounds.

28. The head-worn apparatus of claim 27, wherein an output of the third camera provides visual image of the lips moving, the third camera output being displayable at user option on an associated device for review.

29. The head-worn apparatus of claim 28, further comprising an emitter, the emitter being located on the bail band, wherein ultrasound generation is conveyed to the emitted and a reflected signal from a vocal tract of the user is recovered by the microphone.

30. The head-worn apparatus of claim 26, wherein the visual image of the lips is recordable as at least one of a video data stream and a time-associated recording of any spoken sounds.

31. The head-worn apparatus of claim 25, further comprising a third camera, the third camera being disposed on a facial side of the bail band and being positioned lateral to the lips of the user.

32. The head-worn apparatus of claim 31, further comprising a system for recording the optimum amplification settings for the microphone so that settings for the user are maintained.

33. A method for training a voice recognition system using the apparatus of claim 31.

34. The head-worn apparatus of claim 25, further comprising an illumination source disposed on an opposing side to the second camera on the bail band, so that illumination from the illumination source falls upon an interior surface of the bail band to provide a backdrop illumination for the second camera.

35. The head-worn apparatus of claim 34, further comprising a system for adjusting an illumination level provided by the illumination source to provide an optimum silhouette view of movement of the lips during speaking.

36. The head-worn apparatus of claim 34, further comprising a system for recording settings of the illumination source and of any video gain of the second camera for the user so that the system adjusts the illumination source and the video gain of the second camera when the user again uses the head-worn apparatus.

37. The head-worn apparatus of claim 25, further comprising an IR emitting LED to provide backdrop illumination for the second camera so as to give at least one of high contrast image of front-back and of vertical movement of the lips during speaking and "lip reading" data input to a voice recognition system.

38. A head-worn apparatus comprising:
a bail band configured to pivot, the bail band being wearable on a user's head using the user's ears as reference points for pivoting;
a microphone disposed in a central region on the bail band and being pointed toward the lips of the user; and
a first camera, the first camera being disposed on a nearly central location on a lip side of the bail band, the lip side of the bail band being that part of the bail band closest to the lips of the user;

wherein the first camera is positioned towards the lips so as to provide a frontal lip camera view;

wherein at least a first pivot point on the bail band is situated opposite a second pivot point on the bail band so that stable measurements made of at least one of sound data and spoken data are recognizable by a device; and wherein an output of the first camera provides visual image of the lips moving, the first camera output being displayable at user option on an associated device for review.

39. The head-worn apparatus of claim 38, wherein the visual image of the lips is recordable as at least one of a video data stream and a time-associated recording of any spoken sounds.

40. A head-worn apparatus comprising:

a bail band configured to pivot, the bail band being wearable on a user's head using the user's ears as reference points for pivoting; and a high frequency sound emitting source disposed in a central location on the bail band, so that any emitted sound from the high frequency sound emitting source is directed towards the lips;

wherein at least a first pivot point on the bail band is situated opposite a second pivot point on the bail band so that stable measurements made of at least one of sound data and spoken data are recognizable by a device.

41. The head-worn apparatus of claim 40, wherein the high frequency sound emitting source emits within a range of about 38 kHz frequency to about 100 kHz.

42. The head-worn apparatus of claim 40, wherein the emitted sound is of nearly constant ultrasonic frequency.

43. The head-worn apparatus of claim 40, wherein the emitted sound is configured to be automatically altered so as to vary continuously between lower and upper ultrasonic limit frequencies.

44. The head-worn apparatus of claim 43, wherein the emitted sound is within a range of about 38 kHz to about 44 kHz.

45. The head-worn apparatus of claim 43, wherein a downconverted signal is used as input to a voice recognition system for system training on a provided text, then the downconverted signal is used as input in actual voice recognition operation, so as to provide a text transcription of non-vocalized speech.

46. The head-worn apparatus of claim 45, wherein a downconverted signal is used as input to a voice recognition system on a provided text, so as to provide a data transcription of non-vocalized speech so that a text-to-synthetic speech output can be provided.

47. The head-worn apparatus of claim 45, wherein the downconverted signal is used as a training input for a voice recognition system, aided by a processed video signal from the first camera.

48. The head-worn apparatus of 45, wherein the downconverted signal is used as a training input for a voice recognition system, aided by a processed video signal from the second camera.

49. The head-worn apparatus of 45, wherein the downconverted signal is used as a training input for a voice recognition system, aided by processed video signal from the third camera.

50. A head-worn apparatus comprising:

a bail band configured to pivot, the bail band being wearable on a user's head using the user's ears as reference points for pivoting;

wherein at least a first pivot point on the bail band is situated opposite a second pivot point on the bail band so that stable measurements made of at least one of sound data and spoken data are recognizable by a device; and wherein a separate receiving microphone for ultrasonic frequencies is provided on a central location on the bail band, on the facial side, to convert ultrasound emitting from a vocal tract of the user into electrical signals.

* * * * *